United States Patent
Gahagan et al.

(10) Patent No.: US 11,442,171 B2
(45) Date of Patent: Sep. 13, 2022

(54) THREAT DETECTION AND NOTIFICATION SYSTEM FOR PUBLIC SAFETY VEHICLES

(71) Applicants: Eric Gahagan, Winthrop, MA (US);
Eric Lizotte, Plaistow, NH (US);
Theodore Schnackertz, Tyngsboro, MA (US)

(72) Inventors: Eric Gahagan, Winthrop, MA (US);
Eric Lizotte, Plaistow, NH (US);
Theodore Schnackertz, Tyngsboro, MA (US)

(73) Assignee: 6 Watch, Inc., Winthrop, MA (US)

( * ) Notice: Subject to any disclaimer, the term of this patent is extended or adjusted under 35 U.S.C. 154(b) by 0 days.

(21) Appl. No.: 16/523,690

(22) Filed: Jul. 26, 2019

(65) Prior Publication Data
US 2021/0026019 A1 Jan. 28, 2021

(51) Int. Cl.
*G01S 17/931* (2020.01)
*G08B 29/18* (2006.01)
(Continued)

(52) U.S. Cl.
CPC .............. *G01S 17/931* (2020.01); *G01S 7/51* (2013.01); *G01S 17/58* (2013.01); *G06V 20/20* (2022.01);
(Continued)

(58) Field of Classification Search
None
See application file for complete search history.

(56) References Cited

U.S. PATENT DOCUMENTS 9,738,253 B2 * 8/2017 Czyz ..................... G01S 13/931
9,950,685 B1 4/2018 Deyaf et al.
(Continued)

OTHER PUBLICATIONS

From Infinite Information, LLC, www.infinite-info.com, a one-page document.

*Primary Examiner* — Rebecca A Volentine
(74) *Attorney, Agent, or Firm* — Clifford L. Tager

(57) ABSTRACT

The present invention is directed to a threat detection and notification system which preferably comprises a LIDAR unit capable of detecting an object in its field of view during a first and subsequent refresh scans, and outputting point cloud data representative of the object detected in a refresh frame corresponding to every refresh scan. A server is operatively connected to the LIDAR unit and is capable of receiving the point cloud data and determining, for the object detected within each refresh frame, a predetermined set of object-specific attributes. A user control interface is operatively connected to the server and is capable of creating a watch zone defining an area of interest less than the LIDAR unit's field of view, and is further capable of defining a plurality of watch mode parameters associated with the watch zone. A LIDAR alert engine is operatively connected to the server and is capable of determining whether the object detected in each refresh frame is located within the watch zone, calculating at least one indicant of motion of the object, and comparing at least one object-specific attribute and the at least one indicant of motion of the object to the defined watch mode parameters. The LIDAR alert engine is capable of alerting a predetermined user to the presence of the object in the event the object is within the watch zone and the aforementioned comparison indicates an alert condition.

20 Claims, 17 Drawing Sheets

(51) Int. Cl.
*G01S 7/51* (2006.01)
*G01S 17/58* (2006.01)
*G06V 20/20* (2022.01)
*G06V 20/58* (2022.01)
*B60Q 9/00* (2006.01)

(52) U.S. Cl.
CPC .......... *G06V 20/58* (2022.01); *G08B 29/185* (2013.01); *B60Q 9/00* (2013.01)

(56) References Cited

U.S. PATENT DOCUMENTS

| | | | |
|---|---|---|---|
| 10,322,696 B2* | 6/2019 | Gao | B60R 25/305 |
| 10,421,437 B1* | 9/2019 | Koskan | B60R 25/31 |
| 10,497,232 B1* | 12/2019 | Koskan | G08B 13/181 |
| 10,859,693 B1* | 12/2020 | Sabripour | G01S 13/931 |
| 2009/0251530 A1* | 10/2009 | Cilia | G07C 5/0866 |
| | | | 348/39 |
| 2017/0075888 A1* | 3/2017 | Ekin | G06F 16/51 |
| 2017/0261996 A1* | 9/2017 | Trehard | G05D 1/024 |
| 2017/0278399 A1* | 9/2017 | Ignaczak | G08G 1/165 |
| 2018/0174413 A1* | 6/2018 | Siminoff | G08B 13/1968 |
| 2019/0227175 A1* | 7/2019 | Steinberg | G01S 17/89 |

* cited by examiner

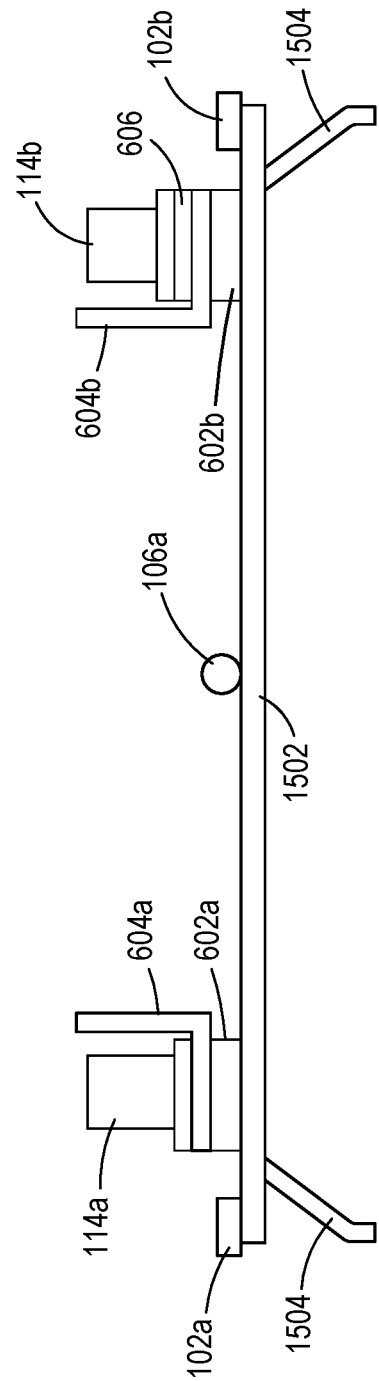
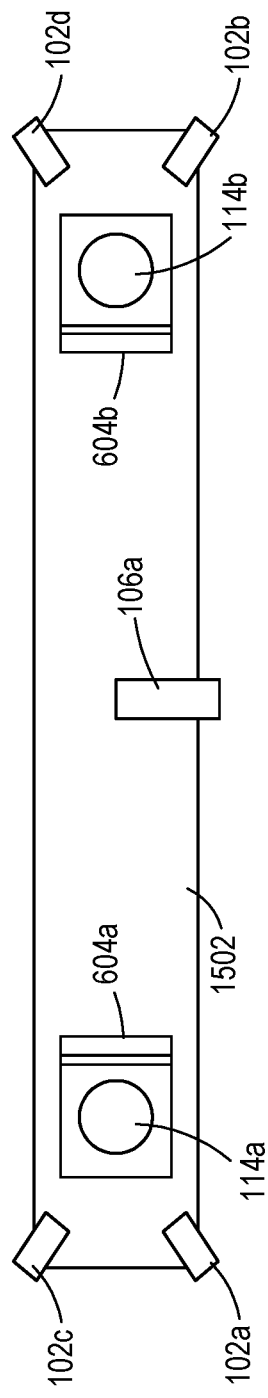

THREAT DETECTION AND NOTIFICATION SYSTEM FOR PUBLIC SAFETY VEHICLES

BACKGROUND OF THE INVENTION

Technical Field

The present invention is directed to a threat detection and notification system. More particularly, the present invention is directed to a threat detection system capable of detecting threats within a predetermined surveillance area and alerting a user to such detected threats, thereby allowing the user to take appropriate precautions and/or actions.

The present invention finds particular utility in both mobile platforms, such as public service vehicles, as well as stationary platforms, such as secure facilities.

Background Information

Public service vehicles, such as police cars, are often fielded with only one officer. In the course of pulling over a target vehicle for whatever reason, for example, excessive speed, unregistered or expired license plates or suspected intoxication, the police officer typically enters specific information into a mobile computer located within the police car before exiting his or her police car to approach the driver of the target vehicle.

This mobile computer, sometimes referred to as a mobile data terminal, is typically connected via wireless or cellular means to a central computer and enables the officer to obtain information on the target vehicle itself and the registered owner thereof, as well as perform other functions that require the officer to divert their attention away from watching the target vehicle, any occupants within that target vehicle, and the surrounding environment.

As a result of the police officer's inability to interact with their mobile computer while simultaneously watching the target vehicle, any occupants therein, and the surrounding environment, there is a need for a threat detection and notification system, independent of the police officer, that is able to watch the target vehicle, its occupants, and the surrounding environment, at all relevant times, and to alert the officer if anyone has exited the vehicle or is otherwise approaching the police car, or if the target vehicle attempts to leave the scene.

It is possible to monitor the area around the police car using cameras and video analytics. For example, streaming video captured by the camera is capable of being analyzed in real time to determine if something within that captured streaming video poses a potential threat to the police officer. Specifically, the frames of the streaming video are capable of being analyzed by the video analytics system to determine if an object within any of those frames matches an object that has been predetermined to be a potential threat to the police officer.

However, this information alone is not dispositive of whether that particular object deemed to be a potential threat is, in fact, a viable threat to the police officer. For example, a person may be defined by the video analytics system as a potential threat, but that person is not a viable threat if that person is traveling away from the police officer or if that person is located at a sufficient distance away from the police officer so as not to be capable of being a viable threat.

Given that streaming video is captured in two-dimensional images, streaming video images do not contain information on the relative position of the object. Thus, determining the proximity of a detected object relative to a fixed point, such as the police officer or the police car, and to do so in real-time, is an drawback to camera-based detection systems.

While it is possible to overcome these deficiencies by displaying the captured streaming video signal on a monitor within the police car for viewing and real-time analysis by the police officer, such a requirement would draw the officer's attention away from their assigned tasks and defeat the objective of a threat detection system independent of the police officer.

For these reasons, a camera-based system utilizing video analytics may not be sufficient to provide an effective threat detection system, independent of the police officer, that can both determine if an object is a potential threat, as well as further determine whether that object is a viable threat so as to reduce or preclude the number of false alarms that may otherwise occur.

SUMMARY OF THE INVENTION

The present invention is directed to a threat detection and notification system, independent of a police officer, capable of detecting threats within a predetermined surveillance area and alerting the officer to such detected threats, thereby allowing the officer to take appropriate precautions and/or actions. For example, the present invention is capable of watching a target vehicle, its occupants, and the surrounding environment, at all relevant times, and to alert the officer if anyone exits the vehicle or is otherwise approaching the police car, or if the target vehicle attempts to leave the scene.

In a first preferred embodiment of the present invention, the threat detection and notification system comprises a LIDAR unit operatively connected to a platform and capable of detecting a first object in its field of view during a first and subsequent refresh scans, and outputting point cloud data representative of the first object detected in a refresh frame corresponding to every refresh scan.

A server is operatively connected to the LIDAR unit and is capable of receiving the point cloud data and determining, for the first object detected within each refresh frame, a predetermined set of object-specific attributes.

A user control interface is operatively connected to the server and is capable of creating a watch zone defining an area of interest less than the LIDAR unit's field of view, and is further capable of defining a plurality of watch mode parameters associated with the watch zone.

A LIDAR alert engine is operatively connected to the server and is capable of determining whether the first object detected in each refresh frame is located within the watch zone, calculating at least one indicant of motion of the first object, and comparing at least one object-specific attribute and the at least one indicant of motion of the first object to the defined watch mode parameters. The LIDAR alert engine is further capable of alerting a predetermined user to the presence of the first object in the event the first object is within the watch zone and the aforementioned comparison indicates an alert condition.

The watch zone capable of being created by the user control interface is preferably a rectangular watch zone. Alternatively, the watch zone capable of being created by the user control interface is a polar watch zone.

The watch mode parameters preferably include object type, such as "person", "vehicle", "other" and "officer".

The watch mode parameters preferably also include velocity. Alternatively, the watch mode parameters preferably also include angle of approach relative to a predetermined reference point.

The at least one indicant of motion of the first object preferably includes the first object's velocity. Alternatively, the at least one indicant of motion of the first object preferably includes the first object's angle of approach relative to a predetermined reference point.

The platform is preferably a mobile platform having a light bar, and the LIDAR unit is preferably operatively connected to the light bar. Alternatively, the platform is preferably a stationary platform having a mounting plate, and the LIDAR unit is preferably operatively connected to the mounting plate.

In the first preferred embodiment of the present invention, the threat detection and notification system preferably further comprises a camera unit operatively connected to the platform and capable of capturing streaming video data having a plurality of individual video frames, and a video interface operatively connected to the camera unit and capable of receiving the captured streaming video data. The server is preferably operatively connected to the video interface and is further capable of receiving the captured streaming video data and making at least a portion of same available to the predetermined user.

The server is preferably further capable of determining whether a second object captured in a video frame matches an object from a list of predetermined objects, and, if so, overlaying a graphics box around the second object such that the graphics box is capable of being viewed simultaneously with the video frame that includes the second object.

In the first preferred embodiment of the present invention, the threat detection and notification system preferably further comprises a video alert engine operatively connected to the server and preferably capable of determining whether a second object captured in a video frame matches an object from a list of predetermined objects, and, if so, alerting the predetermined user to the presence of the second object.

The threat detection and notification system preferably further comprises a microphone unit capable of capturing streaming audio signal, and an audio interface operatively connected to the microphone unit and capable of receiving the captured streaming audio signal. The server is preferably operatively connected to the audio interface and is capable of receiving the captured streaming audio signal, and is further capable of making at least a portion of the captured streaming audio signal available to the predetermined user.

The threat detection and notification system preferably further comprises an audio alert engine operatively connected to the server and is capable of determining whether a portion of the captured streaming audio signal matches a predetermined sound type and, if so, alerting the predetermined user to the presence of the predetermined sound type.

The microphone unit is preferably operatively connected to said platform. Alternatively, the microphone unit is capable of being positioned on the predetermined user.

In a second preferred embodiment of the present invention, the threat detection and notification system preferably comprises a LIDAR unit operatively connected to a platform and capable of detecting a first object in its field of view during a first and subsequent refresh scans, and outputting point cloud data representative of the first object detected in a refresh frame corresponding to every refresh scan.

A camera unit is operatively connected to the platform and is capable of capturing streaming video data having a plurality of individual video frames.

A video interface is operatively connected to the camera unit and is capable of receiving the captured streaming video data.

A server is operatively connected to the LIDAR unit and the video interface, and is capable of receiving the point cloud data and determining, for the first object detected within each refresh frame, a predetermined set of object-specific attributes. The server is further capable of receiving the captured streaming video data.

A user control interface is operatively connected to the server and is capable of creating a watch zone defining an area of interest less than the LIDAR unit's field of view, and is further capable of defining a plurality of watch mode parameters associated with the watch zone.

A LIDAR alert engine is operatively connected to the server and is capable of determining whether the first object detected in each refresh frame is located within the watch zone, calculating at least one indicant of motion of the first object, and comparing at least one object-specific attribute and the at least one indicant of motion of the first object to the defined watch mode parameters. The LIDAR alert engine is further capable of alerting a predetermined user to the presence of the first object in the event the first object is within the watch zone and the aforementioned comparison indicates an alert condition.

A video alert engine is operatively connected to said server and is capable of determining whether a second object captured in a video frame matches an object from a list of predetermined objects, and, if so, alerting the predetermined user to the presence of the second object.

In a third preferred embodiment of the present invention, the threat detection and notification system preferably comprises a LIDAR unit operatively connected to a platform and capable of detecting a first object in its field of view during a first and subsequent refresh scans, and outputting point cloud data representative of the first object detected in a refresh frame corresponding to every refresh scan.

A camera unit is operatively connected to the platform and is capable of capturing streaming video data having a plurality of individual video frames, and a microphone unit is capable of capturing streaming audio signal.

An audio/video interface is operatively connected to the camera unit and the microphone unit, and is capable of receiving the captured streaming video data and the captured streaming audio signal.

A server is operatively connected to the LIDAR unit and the audio/video interface, and is capable of receiving the point cloud data and determining, for the first object detected within each refresh frame, a predetermined set of object-specific attributes. The server is further capable of receiving the captured streaming video data and the captured streaming audio signals.

A user control interface is operatively connected to the server and is capable of creating a watch zone defining an area of interest less than the LIDAR unit's field of view, and is further capable of defining a plurality of watch mode parameters associated with the watch zone.

A LIDAR alert engine is operatively connected to the server and is capable of determining whether the first object detected in each refresh frame is located within the watch zone, calculating at least one indicant of motion of the first object, and comparing at least one object-specific attribute and the at least one indicant of motion of the first object to the defined watch mode parameters. The LIDAR alert engine is further capable of alerting a predetermined user to the presence of the first object in the event the first object is within the watch zone and the aforementioned comparison indicates an alert condition.

A video alert engine is operatively connected to said server and is capable of determining whether a second object captured in a video frame matches an object from a list of predetermined objects, and, if so, alerting the predetermined user to the presence of the second object.

An audio alert engine is operatively connected to the server and is capable of determining whether a portion of the captured streaming audio signal matches a predetermined sound type and, if so, alerting the predetermined user to the presence of the predetermined sound type.

BRIEF DESCRIPTION OF THE DRAWINGS

FIG. 15 is a front profile view of a second embodiment of the present invention.

FIG. 16 is a top view of the second embodiment of the present invention shown in FIG. 15.

DESCRIPTION OF THE PREFERRED EMBODIMENT(S)

The present invention is directed to a threat detection and notification system capable of detecting threats within a predetermined surveillance area and alerting a user group to such detected threats, thereby allowing the user group to take appropriate precautions and/or actions.

The present invention is discussed herein with reference to a public service vehicle, such as a police vehicle. It is to be understood, however, that the present invention is equally capable of being deployed on other mobile platforms, for example, SWAT and military vehicles, armored trucks, mobile protection details, semi-trailer trucks, construction vehicles, farm vehicles, and the like.

Additionally, the present invention is equally capable of being deployed on stationary platforms, for example, governmental buildings, military installations, check points, perimeter-patrol points, water treatment plants, power plants and other structures of interest to national security, and the like.

In a preferred embodiment, the threat detection and notification system of the present invention operates independent of a police officer on whose vehicle the present invention is deployed, and is capable of surveilling a target vehicle and/or a predetermined area around the police vehicle at all relevant times, and alerting the police officer if anyone has exited the target vehicle, if anyone or anything is otherwise approaching the police vehicle, or if the target vehicle attempts to flee the scene.

As used herein, the term "target vehicle" is preferably defined as any vehicle that has been pulled over in a traffic stop, is traveling in the vicinity of the police vehicle, or otherwise becomes a subject of interest of the present invention, as discussed below.

Figure 1:
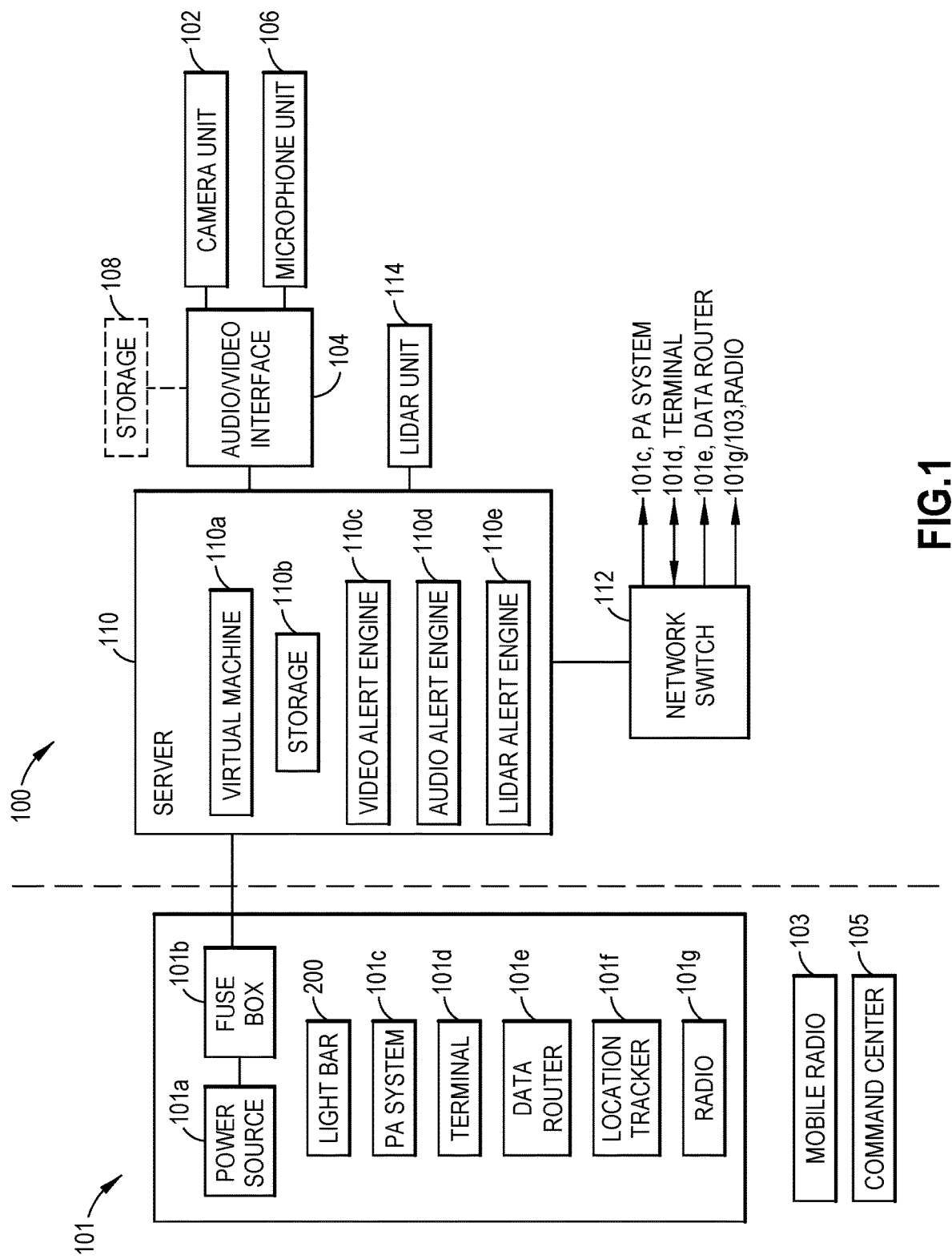
FIG. 1 is a block diagram of a first embodiment of the threat detection and notification system of the present invention.

Turning now to FIG. 1, a block diagram of a first preferred embodiment of threat detection and notification system of the present invention is illustrated. In the first preferred embodiment, threat detection and notification system 100 is preferably operatively installed on police vehicle 101.

Police vehicle 101 typically comprises power source 101a to provide power to the vehicle via fuse box 101b, light bar 200 typically mounted on the exterior thereof, public-address system 101c, such as a speaker located on the exterior of the police vehicle, terminal 101d, such as a mobile laptop computer or data terminal, data router 101e for sending and receiving data, such as a wifi and/or cellular router, location tracker 101f for obtaining the vehicle's position, and radio 101g mounted within the police vehicle.

As will be appreciated by those in the art, command center 105 is typically capable of two-way communication with police vehicle 101 via radio 101g and/or terminal 101d. Mobile radio 103 allows the police officer to maintain two-way communication with command center 105 while in the field.

Radio 101g and mobile radio 103 typically operate on the same channel and same frequency, enabling simultaneous communication to radio 101g and mobile radio 103. Accordingly, any reference below to "radio 101g" also refers to "mobile radio 103", and vice versa, as does the term "radio 101g/103".

Threat detection and notification system 100 preferably comprises camera unit 102 having at least one camera for obtaining streaming video. Camera unit 102 is preferably capable of obtaining streaming video within a 360° field of view centered about police vehicle 101 and operable in outdoor and mobile environments, as well as low-light conditions. As discussed below with reference to FIGS. 2 and 3, camera unit 102 preferably comprises a plurality of individual cameras, such as model F-1005E available from Axis Communications, Lund, Sweden, each having a 113° horizontal angle of view and 62° vertical angle of view in 1080p resolution, a fixed 2.8 mm F2.0 lens, capable of operating in low-light (0.3 lux) conditions.

Alternative cameras having different horizontal and/or vertical angles of view, and thus requiring more or less cameras to adequately cover a 360° field of view, and configurations where the desired streaming video coverage is less than 360°, will each be apparent to one skilled in the art.

Figure 2:
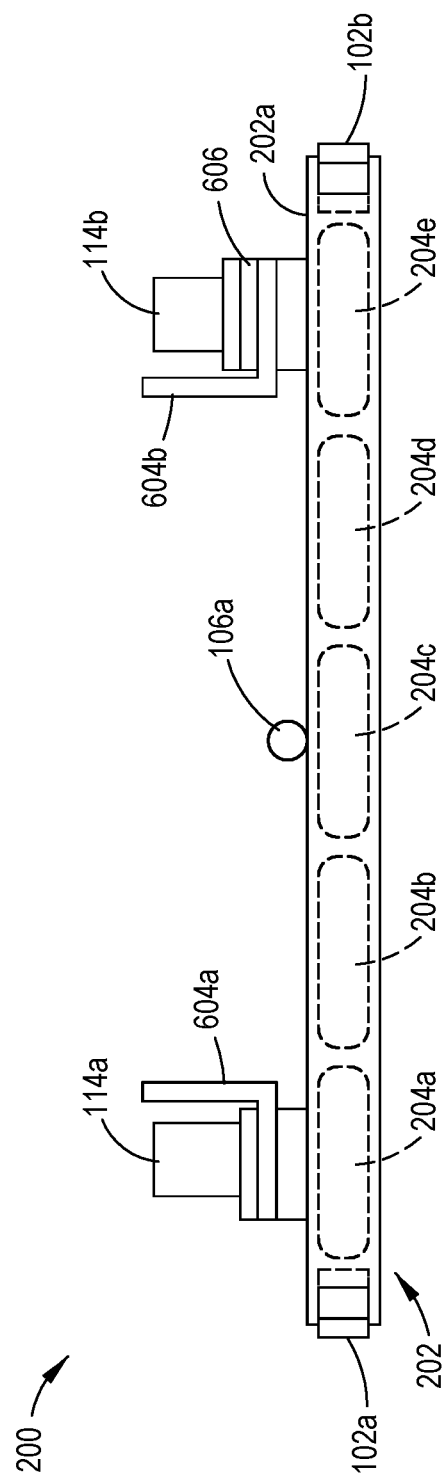
FIG. 2 is a front profile view of a typical light bar attached to a police vehicle.
Figure 3:
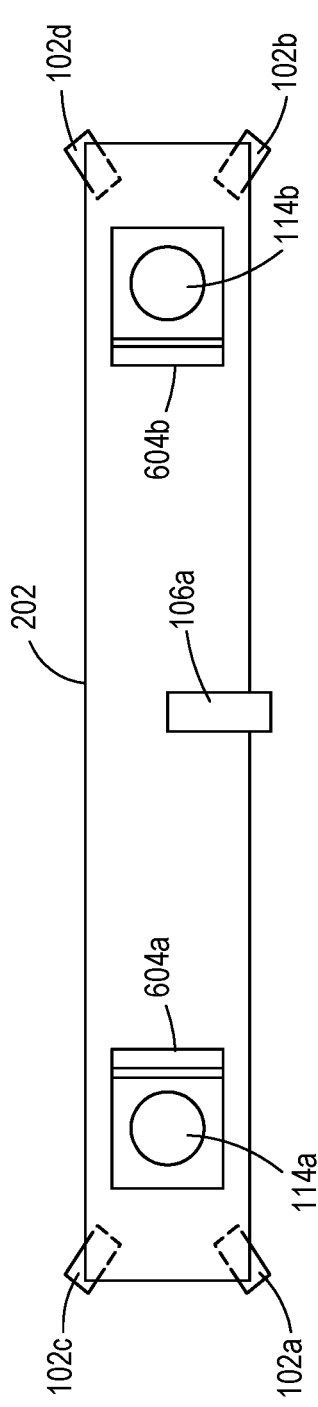
FIG. 3 is a top view of the light bar shown with reference to FIG. 2.

FIG. 2 is a front profile view of light bar 200, and FIG. 3 is a top view of light bar 200 shown in FIG. 2. With reference to FIGS. 2 and 3, light bar 200 represents a typical light bar attached to a police vehicle, such as police vehicle 101, and itself comprises rectangular housing 202 into which are typically housed a plurality of lights 204a-204e capable of illuminating red, white, blue and/or other colors of high-intensity light, either in a continuous or intermittent (e.g., stroboscopic) manner. Light bar 200 is preferably mounted to police vehicle 101 via conventional mounting brackets (not shown), and electrical connections (not shown) operatively connecting light bar 200 to police vehicle 101 will be readily apparent to those skilled in the art.

In the preferred embodiment, camera unit 102 (FIG. 1) preferably comprises four individual cameras 102a, 102b, 102c, and 102d fitted within rectangular housing 202, and more preferably located at the corners thereof to provide greatest possible exposure without dead zones and for field-of-view overlap.

Specifically, to obtain a 360° field of view centered about police vehicle 101, it is preferable to locate cameras 102a-d relatively close to each other and in a relatively high position. This configuration minimizes and/or eliminates dead zones (i.e., areas not covered by cameras 102a-d) by allowing the images captured by cameras 102a-d to overlap each other, as well as allowing each of cameras 102a-d to have an unobstructed view of the area around police vehicle 101.

Cameras 102a and 102b are preferably located at the front opposing corners of rectangular housing 202, and cameras 102c and 102d are preferably located at the rear opposing corners of rectangular housing 202. Each camera is preferably positioned such that their respective horizontal angle of view overlaps both adjacent cameras' angle of view. Given the rectangular shape of housing 202, it has been found that an angle of between 90° and 100° between adjacent side cameras (i.e., 102a and 102c; and 102b and 102d) is preferred, although this angle will be dependent on the exact shape of housing 202, as well as the desired overlap of each adjacent camera's angles of view.

In the preferred embodiment, cameras 102a-d are fitted within rectangular housing 202 such that the lens portion of each camera is external to and approximately flush with its respective corner of rectangular housing 202, and the body portion and connecting cables of each camera are located within rectangular housing 202.

Alternative camera placement, for example, either within, under or over rectangular housing 202, or attached to body panels, roof, hood or trunk of police vehicle 101, will be apparent to one skilled in the art.

Returning to FIG. 1, camera unit 102 is preferably operatively connected to audio/video interface 104 to receive the streaming video data generated by cameras 102a-d (FIGS. 2 and 3). Audio/video interface 104 preferably comprises at least one Ethernet port therein to enable simultaneous streaming of the video feed from cameras 102a-d (FIGS. 2 and 3), as well as to allow the streaming video feed from each camera 102a-d to be accessed via an IP address.

In the preferred embodiment, audio/video interface 104 is preferably a dual-audio input unit such as model F44 available from Axis Communications, which enables streaming of 1080p or HDTV 720p video from four cameras simultaneously through one Ethernet port, supports quad-view streaming which combines separate views from four sensor units into one view for simultaneous viewing such that each camera feed would take up a quarter of a display area on a monitor, and allows each camera feed to be accessed via a separate IP address.

The preferred embodiment further includes microphone unit 106, preferably comprising at least one microphone, operable in outdoor and mobile environments, capable of receiving audio signals emanating from the exterior of police vehicle 101.

Microphone unit 106 preferably comprises an electret condenser, unidirectional microphone 106a facing the front of police vehicle 101 and operatively connected to light bar 202, as shown with reference to FIGS. 2 and 3, such as model ML1-WS weather-resistant microphone available from Electronic Technical Services, Inc., Albuquerque, N. Mex.

Other microphone locations (e.g., facing the rear, driver's side and/or passenger's side of police vehicle 101, located within, under or on the side of rectangular housing 202, and/or located on or in a body panel, external mirror, roof, hood or trunk of police vehicle 101) and microphone types (e.g, omni-directional, bi-directional, cardioid, and hyper-cardioid), dependent on the specific area(s) to be monitored, will be apparent to one skilled in the art.

Alternatively, microphone unit 106 comprises a wireless microphone capable of being worn by the police officer, enabling audio in the vicinity of the police office to be obtained whatever the police officer's location.

Microphone unit 106 is preferably operatively connected to audio/video interface 104, which is capable of transmitting the captured audio signal, together with the captured streaming video signals, as discussed above.

In the preferred embodiment, capturing streaming audio, together with streaming video, allows for a significantly greater capture of relevant information of an event. Specifically, while streaming video is capable of capturing the visual aspect of an event, absent streaming audio accompanying the action, a complete understanding of the event simply is not possible in all situations. In order to have a complete understanding of the event, both video and audio are often required.

Optional storage 108 is operatively connected to audio/video interface 104 to store the streaming video and the audio signals captured by camera unit 102 and microphone unit 106, respectively. In the preferred embodiment, storage 108 comprises a plurality of SD cards locatable therewithin.

Server 110 is preferably operatively connected to audio/video interface 104 to receive the captured audio and streaming video signals therefrom, which captured signals are preferably stored in storage 110b for historic and post-event utilization. Storage of these signals provides historic data capture for use in or for forensic analysis, evidential data and other post-event utilization. While storage 110b is shown as being internal to server 110, it will be apparent to one skilled in the art that storage 110b can be an external storage device operatively connected to server 110 via conventional means, i.e., wired or wireless.

Server 110 preferably comprises data processing capabilities and is operable in outdoor and mobile environments, such as model ESC-9240 GTX1050-7700 available from Rugged Science, Sparks, Md. Server 110 is preferably powered by power source 101a via fuse box 101b of police vehicle 101.

In the preferred embodiment, the present invention includes client-based software having a user control interface, shown in and described with reference to FIG. 14, resident on terminal 101d to allow specific information generated by server 110 to be received at terminal 101d via network switch 112, as well as specific information generated by the user control interface to be received by server 110 via network switch 112 and used thereby, as discussed in more detail below.

Figure 4:
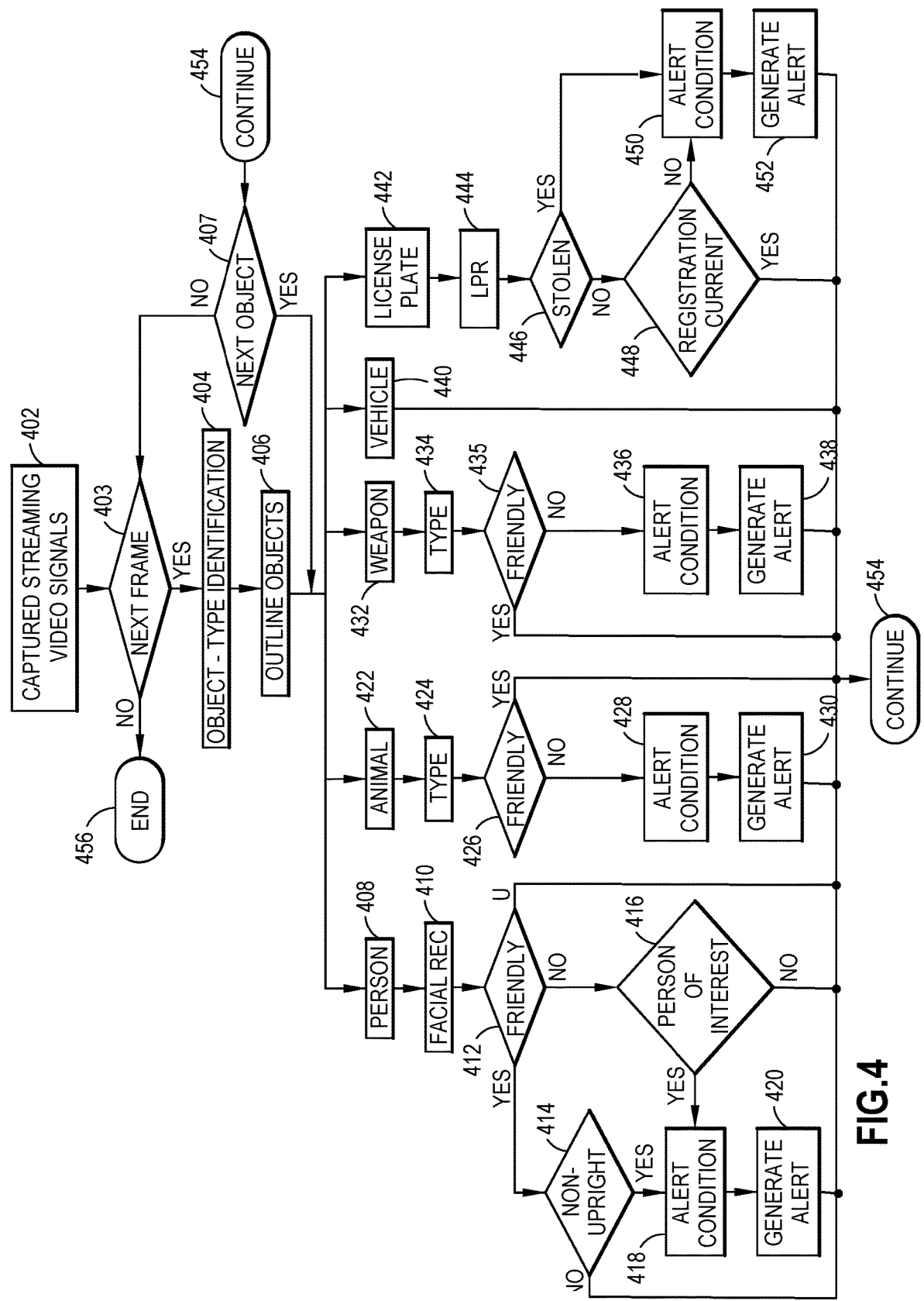
FIG. 4 is a flow diagram for processing captured streaming video signals from the camera unit shown in FIG. 1.
Figure 5:
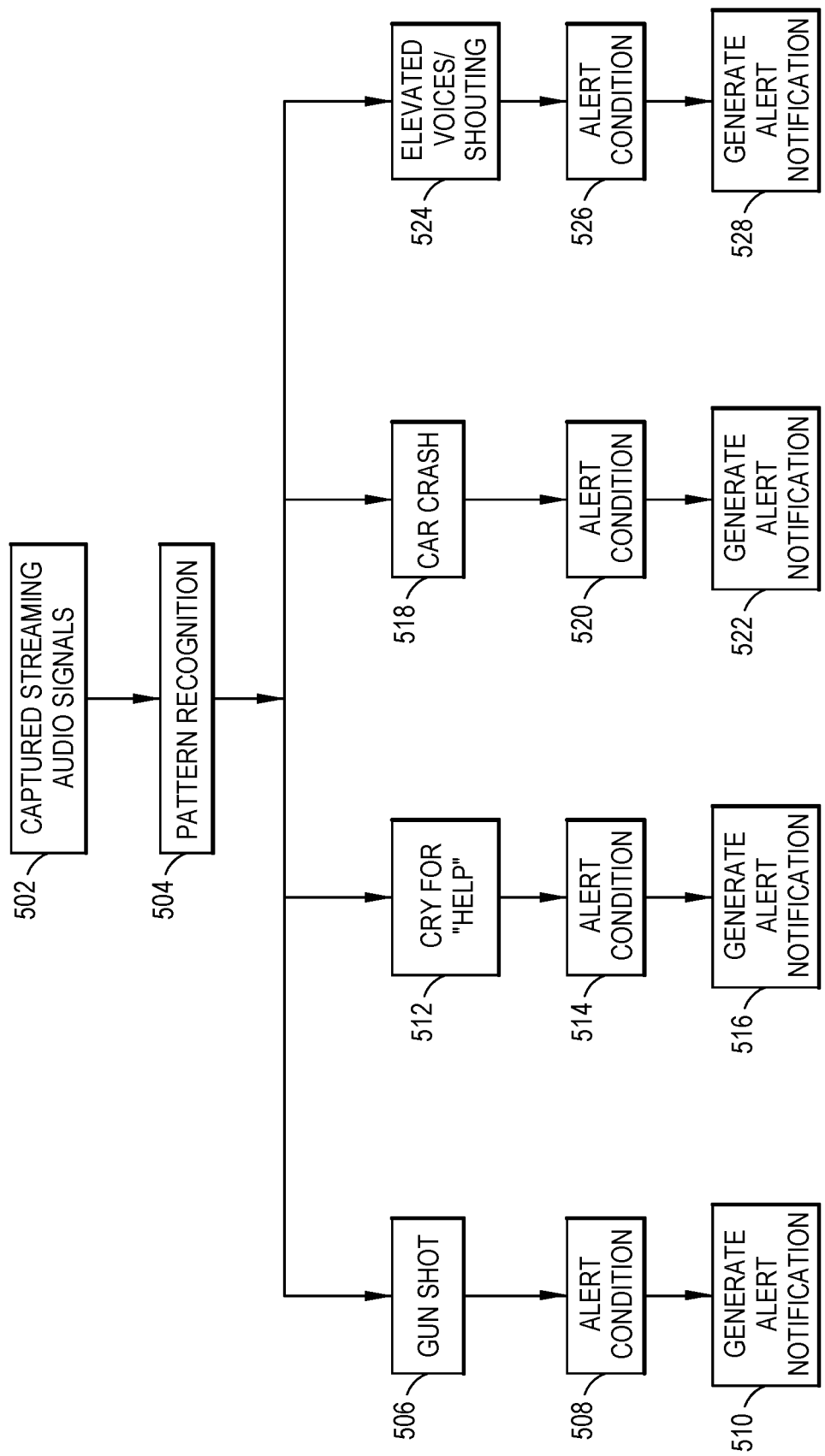
FIG. 5 is a flow diagram for processing captured streaming audio signals from the microphone unit shown in FIG. 1.

Video alert engine 110c preferably processes captured streaming video signals from camera unit 102 as shown with reference to FIG. 4, and audio alert engine 110d preferably processes captured audio signals from microphone unit 106 as shown with reference to FIG. 5.

Turning now to FIG. 4, a preferred embodiment of the flow diagram for processing captured streaming video signals from camera unit 102 (FIG. 1) by video alert engine 110c is shown. Captured streaming video signals 402 are preferably processed on a frame-by-frame basis at 403 by object-type identification algorithms at 404 to determine the specific object type of each object within the frame.

Specifically, each video frame is preferably processed at 404 to identify specific object types deemed to be a potential threat to the police officer, police vehicle 101 (FIG. 1), or of relevance in the administration of public safety. In the preferred embodiment, these specific object types include "person", "animal", "weapon", "vehicle", and "license plate".

While it is possible to identify other objects, or even every object, within each frame, the preferred embodiment identifies the above-mentioned object types as being most relevant to the police officer, police vehicle 101 (FIG. 1), or in the administration of public safety, as discussed in more detail below. Other specific object types to be identified, based on other criteria, will be apparent to one skilled in the art.

Each object that matches one of the above-identified specific object types is preferably outlined at 406 via a graphics box overlaid around the object, and that overlaid outline is preferably embedded within that frame such that the graphics box visually highlights each identified object when the streaming video is subsequently viewed.

The color of the graphics box is preferably dependent on the specific object type, e.g., a blue graphic box for benign objects, such as an animal or vehicle, and a red graphics box for objects that are or could be an imminent-threat, such as a person or weapon.

Various video analytics tools are commercially available to process streaming video on a frame-by-frame basis to determine object type and embed a colored graphics box therearound. For example: Amazon Rekognition, available from Amazon Web Services, Inc., an Amazon business unit; Cloud Video Intelligence, available from Google Cloud, a subsidiary of Alphabet, Inc.; TensorFlow Object Detection, available from Google via Apache 2.0 open-source license; and Azure Cognitive Services tools such as Computer Vision and Custom Vision available from Microsoft Corporation. Other video analytics tools will be apparent to one skilled in the art.

In the preferred embodiment, this added intelligence (object type and graphics-box outline) is capable of being displayed on terminal 101d or on a monitor (not shown) located within command center 105 (FIG. 1).

Figure 14A:
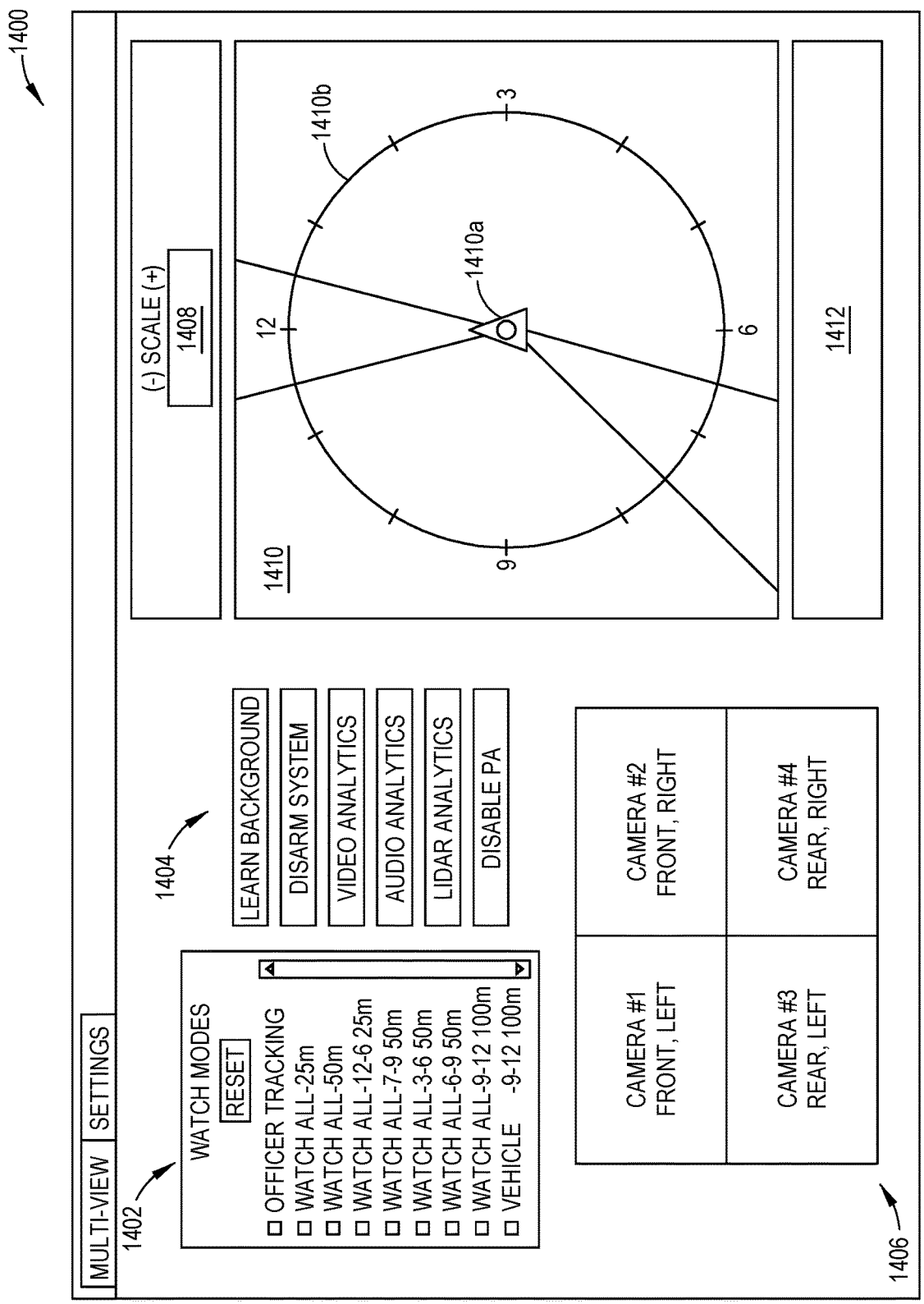
FIGS. 14A and 14B show a layout of the user control interface of the present invention capable of being displayed on a monitor.

The preferred layout of the captured video stream displayable on terminal 101d (FIG. 1) is shown with reference to FIG. 14A, which shows the preferred layout of the multi-view screen of the user control interface capable of being displayed on the monitor (not shown) of terminal 101d. Specifically, area 1406 (FIG. 14A) is capable of displaying the streaming video signals from camera unit 102 (FIG. 1) in quad-view. The specific layout of the captured video stream displayable on a monitor (not shown) within command center 105 (FIG. 1) will be dictated by its specific hardware configurations.

Returning to FIG. 4, object-type identification at 404 and graphics-box object outlining at 406 can be handled either with software resident within server 110 and/or via standardized Application Programming Interface ("API") calls to a remote (e.g., cloud-based) server (not shown) having database technology to store and access specific library functions specific to identifying various objects on both an object-type level (to wit, e.g., "person", "animal", "weapon", "vehicle", and "license plate"), as well as an object-evaluation level, as discussed in more detail below.

While object-type identification to identify a limited number of object types, e.g., "person", "animal", "weapon", "vehicle", and "license plate", can be accomplished using software resident within server 110, in the preferred embodiment, a more-robust object-type identification using API calls is preferred.

Specifically, in the preferred embodiment, the captured streaming video is routed to a remote server via network switch 112 (FIG. 1) and data router 101e (FIG. 1), which remote server preferably includes video analytics tools to conduct a frame-by-frame analysis to determine the specific object type of all objects within the frame, embed a color-coded graphics box around each relevant object type, and return this information to video alert engine 110c for object-evaluation processing.

Where the specific object is identified at 404 as "person", the specific object is preferably further evaluated via "person" path 408 for facial recognition at 410 via a facial-recognition database to determine whether that person is recognized as a "friendly" at 412, preferably defined as an active-duty police officer, active-duty firefighter, other active-duty law enforcement or fire personnel, or others, as may be relevant. Other types of persons classifiable as "friendly" will be obvious to one skilled in the art.

If that person is evaluated at 412 as a "friendly", the person is preferably further evaluated at 414 to determine if that person is in a non-upright position, preferably defined as lying on the ground or in a crouching position, indicating that the "friendly" is or may be in distress and may need assistance.

If that person is not evaluated at 412 as "friendly", the face is preferably further evaluated at 416 to determine if that person's face is in a relevant database as a person-of-interest, preferably defined as in a database of persons known to be dangerous, an escaped convict, or other person in a BOLO (i.e., be-on-the-lookout for) database.

If that person identified at 412 as a "friendly" is evaluated at 414 to be in a non-upright position, or if that person is not a "friendly" and is a person of interest at 416, an alert condition is generated at 418 and video alert engine 110c (FIG. 1) preferably generates at 420 an appropriate alert notification, as discussed below.

The threat detection and notification system of the present invention is preferably capable of operating in a continuous manner, both while police vehicle 101 is in motion, as well as when police vehicle 101 is stationary, e.g., when the police officer has pulled over a target vehicle, has stopped to conduct a field interview with someone, has stopped to observe traffic in either an obvious or concealed manner, or is otherwise stationary. Therefore, the specific alert notification generated by video alert engine 110c is preferably dependent upon whether police vehicle 101 is in motion or is stationary.

The GPS-coordinates of police vehicle 101 are obtainable by location tracker 101f (FIG. 1) and accessible by central command 105 using a standard fleet-tracking system to determine both the location of police vehicle 101, as well as whether it is in motion or stationary.

If police vehicle 101 is in motion, the present invention preferably operates under the assumption that the police officer is located within police vehicle 101 and that no one outside police vehicle 101 will hear any alert notifications.

Accordingly, if police vehicle 101 is in motion, video alert engine 110c preferably generates an appropriate alert notification to radio 101g (FIG. 1), terminal 101d (FIG. 1), allowing for both audio and visual notification to any and all police officers of police vehicle 101, and/or command center 105, as discussed in more detail below.

Any alert notification to terminal 101d is preferably displayable on terminal 101d (FIG. 1) is shown with reference to FIG. 14A. Specifically, area 1412 (FIG. 14A) is capable of displaying an alert notification from video alert engine 110c (FIG. 1). The specific layout of the alert notification displayable on a monitor (not shown) within command center 105 (FIG. 1) will be dictated by its specific hardware configurations.

If police vehicle 101 is stationary, the present invention preferably operates under the assumption that the police officer may be located outside of police vehicle 101, and appropriate alert notifications are generated in a manner calculated to effectively reach the police officer in a safe manner.

Specifically, if police vehicle 101 is stationary, video alert engine 110c preferably generates an appropriate alert notification to radio 101g, terminal 101d and/or command center 105, and optionally to PA system 101c in situations reasonably calculated to assume that the police officer would not be in danger if others heard the alert notification broadcast over PA system 101c.

The present invention preferably allows the police officer to suspend, on an as-needed basis, broadcasting notifications generated by the present invention over PA system 101c in situations where, e.g., the police officer intends to remain in police vehicle 101 while in a stationary position, or will be located outside of police vehicle 101 but does not want any possible notifications to be broadcast over PA system 101c. Specifically, with reference to FIG. 14A, a plurality of on/off touch switches at 1404 includes "disable PA" switch that preferably disables announcements generated by the present invention to PA system 101c until re-enabled by the user.

In the event video alert engine 110c (or audio alert engine 110d or LIDAR alert engine 110e, as discussed below) sends an alert notification to PA system 101c during a period when the PA system has been suspended, the notification will preferably be received but not broadcasted, buffered nor stored for future broadcast.

Alert notifications from video alert engine 110c (as well as audio alert engine 110d and LIDAR alert engine 110e, discussed below) to PA system 101c and/or radio 101g/103 are preferably transmitted either through an Ethernet port (not shown) on server 110 or through an Ethernet port on network switch 112 via a conventional radio bridge system, e.g., MCPTT available from Kodiak Networks, Inc. of Plano, Tex., or Wave PTT Platform or Wave Oncloud, both available from Motorola Solutions.

Alert notifications from video alert engine 110c (as well as audio alert engine 110d and LIDAR alert engine 110e, discussed below) to terminal 101d and/or command center 105 are preferably transmitted through an Ethernet port on network switch 112 via a data router 101e via a conventional cross-platform communication system, such as Command, available from BlueForce Development Corporation of Newburyport, Mass., which allows such alert notifications to be received by terminal 101d and command center 105, provided such cross-platform communication is implemented by the user.

In the preferred embodiment, upon an alert condition being generated at 418, video alert engine 110c preferably generates the following alerts:

where a "friendly" is determined to be in a non-upright position:

(1) notification is sent to command center 105 (FIG. 1) that an "officer is down and may need assistance", together with the current GPS-coordinates of police vehicle 101;

(2) the video frames in which the officer is determined to be in a non-upright position, or alternatively live-feed from camera unit 102 (FIG. 1) from that frame onward, is made available to command center 105, to provide command center 105 the option to visually and audially assess and monitor the situation and initiate back-up or other remedial action, e.g., notify other police officers of police vehicle 101's location in an effort to assist; and (3) notification is sent to radio 101g (FIG. 1), terminal 101d, and PA system 101c that an "officer is down", allowing all other police officers on the scene to receive the audible notification in the event of a noisy environment that masks or otherwise muffles the volume of radio 101g;

where a "non-friendly" is identified as a person of interest:

(1) if police vehicle 101 is in motion, notification is preferably sent to terminal 101d and radio 101g; if police vehicle 101 is stationary, notification is preferably sent to radio 101g, terminal 101d and PA system 101c. It may be preferable that the alert sent over PA system 101c is not obvious, e.g., "code 18" or some other innocuous message that would not alert the person-of-interest that they have been identified;

(2) notification is sent to command center 105, together with the GPS-coordinates of police vehicle 101, that a person-of-interest has been identified, and (3) the frames in which the person of interest is present or live-feed from camera unit 102 (FIG. 1) is made available to command center 105, at which point command center 105 has the ability to review the video and, where warranted, notify other police officers in the vicinity of police vehicle 101's location or other law enforcement officials of the identification and last-known location of the person of interest.

In all other cases, including where facial recognition at 410 is unable to obtain a clear view of the face with that frame, e.g., it is hidden from view or otherwise visually obscured (and thus defining that face as an "unknown" ("U") with respect to being a "friendly" at 412), the process continues at 454.

Where the specific object is identified at 404 as "animal", the specific object is preferably further evaluated via "animal" path 422 to identify at 424 the animal type via a database to determine whether that animal is generally categorized at 426 as "friendly".

In the preferred embodiment, an animal is classified as "friendly" unless it is deemed to be one that may pose a potential or actual threat or nuisance to the police officer, the public, or police vehicle 101. Such "non-friendly" animals preferably include, for example, aggressive and/or wild animals, and animals typically kept at a zoo (to take into account a zoo animal that may have gotten out). Other types of animals classifiable as "non-friendly" will be apparent to one skilled in the art.

If the animal is evaluated at 426 as "friendly", the process continues at 454. Otherwise, an alert condition is generated at 428 and video alert engine 110c (FIG. 1) preferably generates the following alerts regardless of whether police vehicle 101 is in motion or stationary:

(1) notification is sent to terminal 101d (FIG. 1) and radio 101g (FIG. 1) of the presence of the animal; and (2) if the animal is one classified as a threat to the public or an escaped zoo animal that had not yet been recovered, (a) notification is sent to command center 105, together with the GPS-coordinates of police vehicle 101, that such an animal has been located, and (b) the frames in which such an animal appears or live-feed from camera unit 102 (FIG. 1) are made available to command center 105.

Where police vehicle 101 is stationary, the police officer is preferably also alerted via PA system 101c. This alert is preferably sent regardless of the type of animal evaluated as "non-friendly", including, e.g., all types of dogs, since same may distract the police officer from their field duties or otherwise surprise an officer unless alerted to their presence.

Where the specific object is identified at 404 as "weapon", the specific object is preferably further evaluated via "weapon" path 432 to identify at 434 the specific weapon type via a database to determine whether the weapon is, e.g., a knife, handgun, or rifle. Other types of weapons for further evaluation to determine weapon type will be apparent to one skilled in the art.

In the preferred embodiment, the presence of any type of weapon, whether located on the target vehicle (such as a gun rack mounted on the target vehicle) or on a person (other than a "friendly" at 435) is defined as a potential threat condition, either to the police officer or to the public within the vicinity where the weapon is identified.

Accordingly, where a weapon is identified on a non-friendly (at 435), an alert condition is generated at 436 and video alert engine 110c (FIG. 1) preferably generates the following alerts:

(1) if police vehicle 101 is in motion, notification is sent to terminal 101d and radio 101g, and if police vehicle 101 is stationary, notification is sent to terminal 101d, radio 101g, and PA system 101c, of that specified weapon type, identified at 434 (e.g., "gun" or "knife");

(2) notification is sent to command center 105 (FIG. 1) that a specified weapon type is present, together with the GPS-coordinates of police vehicle 101; and (3) the frames in which the weapon is present or live-feed from camera unit 102 (FIG. 1) is made available to command center 105.

It will be appreciated that "weapon" path 432 can be modified to take into account, e.g., jurisdictions where a large percentage of vehicles carry a rifle in a gun rack visible to the camera unit 102 (FIG. 1), either year-round or during hunting season. In such cases, path 432 can be modified to distinguish between rifles contained in a gun rack (and therefore less of an imminent threat to the police officer) and rifles not contained in a gun rack. For weapons deemed to be less of an imminent threat to the police officer, path 432 can be modified, e.g., not to generate an alert if the rifle is identified as being contained in a gun rack.

Where the specific object is identified as "vehicle" at 404, the specific object is capable of being further evaluated via "vehicle" path 440 to identify, e.g., the specific type of vehicle (e.g., manufacture, make and model), the color or other attribute of the vehicle via a database to determine same, and the identified vehicle can further be checked against a database of vehicles of interest to local, state or federal law enforcement, in which case an alert can be sent to radio 101g, terminal 101d and/or command center 105 if this identified vehicle produces a match.

Path 440 is capable of acting as a safety-check. For example, where a target vehicle has had its issued license plate replaced with a substitute license plate, license-plate reader 444 can identify the color, make and body type of the vehicle registered to the substitute license plate. If any of that information does not correspond with that of the target vehicle, an alert condition can be generated and video alert engine 110c (FIG. 1) can generate an appropriate alert notification.

In the preferred embodiment, the specific object identified as "vehicle" at 404 is not further evaluated at this point. The police officer is still capable of querying a target vehicle, should he or she so desire, via conventional means.

Where the specific object is identified as "license plate" at 404, the specific object is capable of being further evaluated via "license plate" path 442 to identify the license plate number and issuing state of the license plate, as well as vehicle's color, make and body type (e.g., Silver Chevrolet sedan) via license-plate reader ("LPR") at 444. Commercially available license plate readers are known in the art, for example, OpenALPR Cloud API, for obtaining this information via an API call, and OpenALPR Cloud Stream, for obtaining this information via software installable on a local computer, such as server 110 (FIG. 1), both available from OpenALPR Technology, Inc., Boston, Mass.

Once the specific license plate is identified at 444 by LPR, that plate number is preferably checked against a relevant state database to determine, at 446, if that license plate belongs to a vehicle that has been reported as "stolen" or is otherwise of interest to local, state or federal law enforcement, as well as preferably checked against a relevant database, at 448, to determine if that license plate belongs to a vehicle whose registration is current.

If the license plate belongs to a vehicle that has been reported as stolen or is otherwise of interest to local, state or federal law enforcement, or if the license plate belongs to a vehicle whose registration is not current, an alert condition is generated at 450 and video alert engine 110c (FIG. 1) preferably generates the following alerts:

(1) if police vehicle 101 is in motion, notification that the target vehicle either is stolen, is otherwise of interest to law enforcement, or has an expired registration is sent to terminal 101d and radio 101g, and if police vehicle 101 is stationary, this notification is sent to terminal 101d, radio 101g and PA system 101c. It may be preferable that the alert sent over PA system 101c is not obvious, e.g., "code 22" or some other innocuous message that would not alert the driver of the target vehicle that the vehicle has been so identified;

(2) notification is made available to command center 105 (FIG. 1) that a vehicle either is stolen, is otherwise of interest to law enforcement, or has an expired registration has been located, together with the GPS-coordinates of police vehicle 101; and (3) the frames in which the vehicle is present or live-feed from camera unit 102 (FIG. 1) are made available to command center 105.

Other alert notifications generated by video alert engine 110c at 420, 430, 438 and/or 452 will be apparent to one skilled in the art.

In all cases, the routine continues at 454 to evaluate at 407 all other objects within the frame until all objects identified at 404 have been evaluated. Once all objects identified at 404 within that frame have been evaluated, the next frame of the captured streaming video is analyzed at 403, and the process continues until all frames of the captured video stream have been evaluated.

Alternatively, the user is able to terminate the video threat-assessment methodology discussed above with reference to FIG. 4, preferably by sending a termination signal from the user control interface, discussed with reference to FIG. 14A. Specifically, with reference to FIG. 14A, a plurality of on/off touch switches at 1404 includes "Video Analytics" switch that preferably disables the video analytics analysis discussed above with reference to FIG. 4.

It should be noted that the process outlined above for paths 408, 422, 432, 440 and 442 occurs automatically, independent of the police officer, thereby saving the police officer valuable response time in the event of an actionable alert condition.

Additionally, while sending notification to both radio 101g and terminal 101d may appear to be duplicative, receiving the same notification on both devices allows the police officer to turn down the volume on radio 101g, for whatever reason, without running the risk of missing any alert notifications.

Furthermore, by making alert notifications, GPS coordinates and streaming video available to command center 105 (FIG. 1) contemporaneously with the event that precipitated the alert condition, personnel at command center 105 have the opportunity to take actions that the police officer on the scene may be unable to perform, for example, (1) notify other law enforcement personnel in the area of the GPS-coordinates transmitted with the alert notification so that others can respond appropriately, (2) dispatch medical personnel and an ambulance to the location of the GPS-coordinates, and/or (3) remotely view the streaming video feed captured by camera unit 102 in real-time in a more-objective environment, minimizing potential errors borne out of confusion at the scene, and (4) closely monitor the situation as it develops in the field and take appropriate action as deemed necessary or advisable.

Moreover, by making "live feed" streaming video available to command center 105 allows for the establishment one or more remote command and control locations, either in addition to or in lieu of one established at the scene, thereby allowing simultaneously viewing the scene from multiple locations, e.g., at various law enforcement agencies desiring to monitor the scene in real time.

A list of alert notifications generated by video alert engine 110c at 420, 430, 438 and 452, as discussed above with reference to FIG. 4, is summarized in Table 1, below.

TABLE 1

| Alert | Object Pattern | Notification and Other Actions |
|---|---|---|
| 420 | Friendly in non-upright position | send "officer down" notification to Command Center w/GPS-coordinates make relevant frames or live-feed available to Command Center send notification to radio, terminal and PA system |
|  | Person of Interest detected | if vehicle in motion, send notification to radio and terminal if vehicle stationary, send notification to radio, terminal and PA system send "person of interest" notification to Command Center w/GPS-coordinates make relevant frames or live-feed available to Command Center |
| 430 | Non-friendly animal | whether vehicle in motion or stationary and animal is threat to public or zoo animal: send notification to terminal and radio send notification to Command Center w/GPS-coordinates make relevant frames or live-feed |

TABLE 1-continued

| Alert | Object Pattern | Notification and Other Actions |
|---|---|---|
|  |  | available to Command Center if vehicle stationary, send notification to PA system |
| 438 | Weapon | if on non-friendly and vehicle in motion, send notification to radio and terminal if on non-friendly and vehicle stationary, send notification to radio, terminal and PA system send "weapon identified" notification to Command Center w/GPS-coordinates make relevant frames or live-feed available to Command Center |
| N/A | Vehicle | further analysis waived |
| 452 | License plate | for stolen vehicle, vehicle of interest or expired registration: if vehicle in motion, to radio and terminal if vehicle stationary, to radio, terminal and/or P/A send appropriate notification to Command Center w/GPS-coordinates make relevant frames or live-feed available to Command Center |

With reference to FIG. 1, streaming audio signals obtained from microphone unit 106 and captured by audio/video interface 104 are preferably processed on a streaming (i.e., continuous) basis by speech-pattern recognition software to determine if any one of a predetermined number of specific sound types, signifying an alert condition, has been received.

Turning now to FIG. 5, a preferred embodiment of the flow diagram for processing captured streaming audio signals from microphone unit 106 (FIG. 1) by audio alert engine 110d is shown.

As shown in FIG. 5, streaming audio signals at 502 are preferably processed on a streaming (i.e., continuous) basis at 504 by audio-pattern recognition software to determine if any one of a predetermined number of specific sound types has occurred been received.

In the preferred embodiment, these specific sound types include "gunshot" (at 506), a cry for "help" (at 512), a "car crash" (at 518), and "elevated voices", i.e., "shouting" (at 524). While it is possible to identify many more sound types using commercially-available audio-pattern recognition tools, the preferred embodiment prioritizes these specific sound types as being most relevant to the police officer in the field or in the administration of public safety, as discussed in more detail below. Other specific sound types will be apparent to one skilled in the art.

Various audio-pattern recognition tools are commercially available to process streaming audio on a continuous basis, for example, Cloud Speech-to-Text (which recognizes 120 different languages), available from Google Cloud, a subsidiary of Alphabet, Inc. Other audio-pattern recognition tools will be apparent to one skilled in the art.

Audio-pattern recognition to identify a limited number of specific sound types, e.g., "gunshot", a cry for "help", a "car crash", and "elevated voices" (i.e., "shouting"), can be implemented using software resident within server 110. In the preferred embodiment, audio-pattern recognition will be implemented using remote, cloud-based, software employing API calls.

Specifically, the captured audio stream is preferably routed to a remote (e.g., cloud-based) server via network switch 112 (FIG. 1) and data router 101e (FIG. 1), which conducts audio-recognition analysis to determine if any one of a predetermined number of specific sound types is detected within the captured streaming audio signal, and returns this information to server 110 for alert-condition processing via audio alert engine 110d.

When a specific audio pattern is identified as a "gunshot" at 504, an alert condition is generated at 508 and audio alert engine 110d (FIG. 1) preferably generates an alert notification at 510, as discussed below.

When a specific audio pattern is identified as a "cry for help" at 504, an alert condition is generated at 514 and audio alert engine 110d (FIG. 1) preferably generates an alert notification at 516, as discussed below.

When a specific audio pattern is identified as a "car crash" at 504, an alert condition is generated at 520 and audio alert engine 110d (FIG. 1) preferably generates an alert notification at 522, as discussed below.

When a sound bite of speech is at or above a predetermined decibel level (e.g., 78 dB) for at least a predetermined period of time (e.g., 1.5 seconds), defined by the present invention as "elevated voices" or "shouting" at 504, an alert condition is generated at 526 and audio alert engine 110d (FIG. 1) preferably generates an alert notification at 528, as discussed below.

In the preferred embodiment, upon an alert condition being generated at 508 ("gunshot"), 514 ("cry for help"), 520 ("car crash"), and 526 ("elevated voices" or "shouting"), audio alert engine 110d (FIG. 1) preferably takes the following actions:

(1) if police vehicle 101 is in motion, appropriate notification specific to the alert condition is sent to terminal 101d (FIG. 1) and radio 101g (FIG. 1);

(2) appropriate notification specific to the alert condition is made available to command center 105, together with the GPS-coordinates of police vehicle 101; and (3) the relevant audio file of the sound bite, including a brief time before and a brief time after (e.g., 2 second), is made available to command center 105, together with the streaming video file that corresponds to this time window.

For alert conditions generated at 508 ("gunshot"), 520 ("car crash") and 524 ("elevated voices") when police vehicle 101 is stationary, the police officer is preferably notified thereof via an alert notification specific to the alert condition sent to terminal 101d (FIG. 1) but not radio 101g (FIG. 1), it being assumed that the police officer is on the scene and can adequately hear these particular sounds and recognize them for what they are.

For an alert condition generated at 514 ("cry for help") when police vehicle 101 is stationary, it is assumed that a "cry for help" is something that the police officer might not be able to readily detect at the scene and, for public safety reasons, the police officer is preferably notified thereof via a "cry for help" alert notification sent to terminal 101d, radio 101g and PA system 101c (FIG. 1).

In all cases, the routine continues to evaluate the captured audio stream (from 502) until all audio has been evaluated. Alternatively, the user is able to terminate the audio threat-assessment methodology discussed above with reference to FIG. 5, preferably by sending a termination signal from the user control interface, discussed with reference to FIG. 14A. Specifically, with reference to FIG. 14A, a plurality of on/off touch switches at 1404 includes "Audio Analytics" switch that preferably disables the audio analytics analysis discussed above with reference to FIG. 5.

Other specific sound types to identify, as well as alternative alert actions, will be apparent to one skilled in the art, it being understood that the various sound types alert actions discussed above are not meant to be exhaustive.

A list of alert notifications generated by audio alert engine 110d at 510, 516, 522 and 528, as discussed above with reference to FIG. 5, is summarized in Table 2, below.

TABLE 2

| Alert | Sound Type | Notification and Other Actions |
|---|---|---|
| 510 | gunshot | alert police officer<br>if vehicle in motion, to radio and terminal<br>if vehicle stationary, to terminal<br>send "possible shots fired" notification<br>to Command Center w/GPS-coordinates<br>make relevant audio file and corresponding<br>video stream file or live-feed available<br>to Command Center |
| 516 | cry for help | alert police officer<br>if vehicle in motion, to radio and terminal<br>if vehicle stationary, to radio, terminal and PA<br>send "cry for help heard" notification to<br>Command Center w/GPS-coordinates<br>make relevant audio file and corresponding<br>video stream file or live-feed available<br>to Command Center |
| 522 | car crash | alert police officer<br>if vehicle in motion, to radio and terminal<br>if vehicle stationary, to terminal<br>send "car crash" notification to Command<br>Center w/GPS-coordinates<br>make relevant audio file and corresponding<br>video stream file or live-feed available<br>to Command Center |
| 528 | elevated voices/shouting | alert police officer<br>if vehicle in motion, to radio and terminal<br>if vehicle stationary, to terminal<br>send "shouting at scene" notification to<br>Command Center w/GPS-coordinates<br>make relevant audio file and corresponding<br>video stream file or live-feed available<br>to Command Center |

Returning now to FIG. 1, threat detection and notification system 100 preferably further comprises LIDAR unit 114 having at least one LIDAR (also referred to as LiDAR or lidar) sensor capable of imaging objects in a three-dimensional space within a 360° field of view centered about police vehicle 101, independent of ambient light, infrared signature and atmospheric conditions, and operable in indoor, outdoor, mobile and stationary environments.

LIDAR allows for the detection and determination of the size, distance, speed and direction of all objects, both animate and inanimate, located within the LIDAR sensor's field of view, and is capable of operating in conditions devoid of ambient light, allowing for the early-detection of objects, e.g., people, animals and/or vehicles, that may pose a threat to a police officer or police vehicle 101.

LIDAR sensors operate by measuring the distance to a target by illuminating the target with pulsed laser light and measuring the reflected pulses with a sensor. Sensitive sensors calculate the light's bounce-back time-of-flight to measure the object's distance and obtain the collected data as a reproducible three-dimensional point cloud. Most LIDAR sensors use multiple laser beams in order to obtain a denser point-cloud data set.

While it is feasible to use a single LIDAR sensor that operates in a 360° field of view, it has been found that, given current technology, the sensor would have to be positioned well-above the roof of a standard-height sedan (upwards of 12 inches) to function as desired by the present invention, rendering such positioning both a target for vandalism, as well as optically undesirable.

It has also been found that a LIDAR sensor's laser beams tend to be located further apart from each other (i.e., separate) the farther one moves away from the sensor. For example, at 100 meters, the beams could be upwards of 6 meters apart, impacting the point cloud data set and thus the "visibility" of the LIDAR sensor at that range.

It has been found that the beam-separation issue impacting the "visibility" of the sensor can be resolved by increasing the number of LIDAR sensors and positioning them such that the beams generated by the multiple LIDAR sensors are interleaved. An advantage of using multiple LIDAR sensors also obviates the need to position the LIDAR sensors well above the roof of a standard-height sedan. Specifically, it has been found that positioning two LIDAR sensors approximately four to five inches above the roof of a Dodge Charger results in favorable long-distance LIDAR coverage.

Accordingly, for the above technical reasons, as well as to provide a threat detection and notification system having point-cloud data coverage capable of detecting objects substantially far away from a police vehicle or other public service vehicle so as to provide an early-warning system to police officers or other public service personnel, LIDAR unit 114 preferably comprises two LIDAR sensors.

Various LIDAR sensors are available, such as model M8 available from Quanergy Systems, Inc., Sunnyvale, Calif., which provides a 360° field of view and long-range LIDAR capabilities, specifically, up to 200 meters at 80% reflectivity, and up to 110 meters at 10% reflectivity. "Reflectivity" is the amount of light reflected back from an object: "80% reflectivity" means that 80% of the laser beams are reflected back to the sensor (for the 200-meter coverage), and "10% reflectivity" means that 10% of the laser beams are reflected back to the sensor (for the 110-meter coverage).

With reference to FIGS. 2 and 3, LIDAR sensors 114*a* and 114*b* are preferably mounted on top surface 202*a* of rectangular housing 202 of light bar 200 and preferably positioned at opposite ends thereof.

Figure 6:
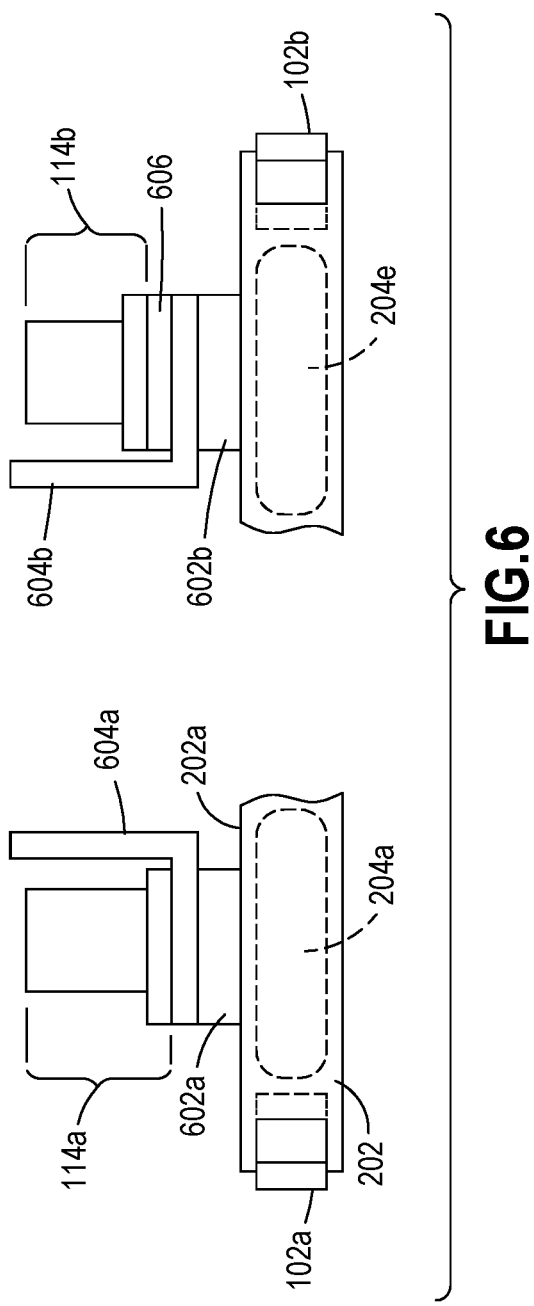
FIG. 6 is a front profile view of the light bar shown with reference to FIG. 2, showing the mounting of LIDAR sensors thereto in more detail.

FIG. 6 is a front profile view of a close-up of the left and right sides of rectangular housing 202 of light bar 200 shown in FIG. 2, illustrating the mounting of LIDAR sensors to rectangular housing 202 in more detail. With reference to FIG. 6, LIDAR sensors 114*a* and 114*b* are preferably mounted to top surface 202*a* of rectangular housing 202 via base plates 602*a* and 602*b*, respectively. Scatter shields 604*a* and 604*b* are preferably included and positioned diametrically-opposed to each other to shield LIDAR sensor 114*a* from the light beams emanating from LIDAR sensor 114*b*, and vice versa.

Spacer 606 is preferably located under one of the LIDAR sensors, shown in FIG. 6 as being located under 114*b*, and preferably tilts LIDAR sensor 114*b* approximately 2°, relative to top surface 202*a* of rectangular housing 202, to allow the LIDAR sensor beams generated by LIDAR sensor 114*a* to interleave with the LIDAR sensor beams generated by LIDAR sensor 114*b*, to compensate for the beam-separation issue discussed above, thereby improving long-range object detection.

Additionally, top surface 202*a* of rectangular housing 202 to which LIDAR sensors 114*a* and 114*b* are mounted is preferably located at least about four inches above the roof of police vehicle 101 for favorable 360° LIDAR coverage, as discussed above.

LIDAR sensors 114*a* and 114*b* are preferably positioned near the terminal ends of light bar 200 to allow for unobstructed 360° LIDAR coverage of the area around police vehicle 101.

Light bar 200 is ideally positioned over the roof of police vehicle 101 via conventional light-bar mounting brackets (not shown) such that top surface 202*a* of rectangular housing 202 is in a substantially horizontal position, and such that its lateral midpoint is approximately centered over the longitudinal axis of police vehicle 101. LIDAR sensors 114*a* and 114*b* are preferably positioned equidistant from each other, relative to the lateral midpoint of rectangular housing 202 of light bar 200. Such ideal and preferred positioning, however, is not critical to the operation of the LIDAR sensors of the present invention.

Specifically, regardless of the positioning of LIDAR sensors on rectangular housing 202 relative to its lateral midpoint, and regardless of the positioning of light bar 200 relative to the longitudinal axis of police vehicle 101, LIDAR sensors 114*a* and 114*b* are preferably calibrated in their installed positions on rectangular housing 202 after light bar 200 has been mounted to police vehicle 101.

LIDAR sensor calibration, available from Quanergy Systems, Inc., is capable of calibrating the LIDAR sensors such that the QORTEX software that processes the LIDAR point cloud data (discussed below) views the two LIDAR sensors as a single LIDAR sensor located at any point in space ("reference point"). In the preferred embodiment, LIDAR sensors 114*a* and 114*b* are calibrated such that they are viewed as a single LIDAR sensor with the calibrated reference point being on top surface 202*a* of rectangular housing 202 of light bar 200 located over the longitudinal axis of police vehicle 101 in the center of the roof of police vehicle 101 at the height of top surface 202*a*. Accordingly, the term "center of police vehicle 101" as used herein means the preferred calibrated reference point discussed above. Other calibrated reference point locations will be apparent to one skilled in the art.

LIDAR sensors 114*a* and 114*b*, base plates 602*a* and 602*b*, scatter shields 604*a* and 604*b*, and spacer 606 are available from Quanergy Systems, Inc., Sunnyvale, Calif. Other manufactures, mounting methods, and mounting positions will be apparent to one skilled in the art. For example, LIDAR sensors can alternatively be located at other positions on police vehicle 101, e.g., on body panels, roof, hood or trunk of police vehicle 101, and additional LIDAR sensors can be deployed thereon to adequately cover a 360° field of view, if so desired.

Returning now to FIG. 1, virtual machine 110*a* is preferably operatively connected to LIDAR unit 114 to receive and process the point cloud data therefrom.

LIDAR sensors 114*a* and 114*b* (FIG. 2) can be powered via a separate transformer (not shown) operatively connected to power source 101*a* via fuse box 101*b* of police vehicle 101, and the point cloud data output by LIDAR sensors 114*a* and 114*b* can be operatively routed to virtual machine 110*a* via network switch 112. In the preferred embodiment, LIDAR sensors 114*a* and 114*b* are powered by server 110 and the point cloud data output by LIDAR sensors 114*a* and 114*b* are operatively routed to virtual machine 110*a* of server 110 via "power-over-Ethernet" connections.

In the preferred embodiment, point cloud data obtained by LIDAR sensors 114*a* and 114*b* is preferably processed by virtual machine 110*a*, such as UBUNTU, available from Canonical Group Limited, London, England, using QORTEX software, available from Quanergy Systems, Inc.

The preferred LIDAR sensors of the present invention are capable of obtaining point cloud data at various configurable refresh rates, measured in cycles/second, based on user-established set-up parameters. In the preferred embodiment, the refresh rate is 10 cycles/second (i.e., a refresh scan every 0.1 seconds). The data obtained by the LIDAR sensors at each refresh scan is referred to as a "refresh frame" or "frame".

The QORTEX software processes the point cloud data and determines, inter alia, for each refresh frame, the following frame-specific information: (a) a unique frame identification number; (b) a sequence number (i.e., the logical order of where an object starts and where it ends in the LIDAR scan); (c) a time stamp of that frame; and (d) a list of objects within each frame.

For each object detected within each refresh frame, the QORTEX software also determines, inter alia, the following object-specific attributes: (i) a unique object identification number; (ii) an object classification as "person", "vehicle" or "other" (i.e., not classified by the QORTEX software as either "person" or "vehicle"); (iii) the position of that object in space (xyz coordinates), relative to a reference point; (iv) that object's size (length, width and height); (v) a time stamp of when that object was initially detected; and (vi) the distance that object traveled from the last refresh frame, measured as Δx, Δy, Δz, relative to the reference point. It should be noted that the QORTEX software defines the X-axis such that the +X axis is to the left and the −X axis is to the right.

The frame-specific information and object-specific attributes discussed above are preferably stored at storage 110b of server 110 in ROSbag format, and same is preferably made available by virtual machine 110a to server 110 for processing by the present invention, as discussed in more detail below.

LIDAR sensors 114a and 114b are capable of detecting all objects in their line-of-sight, including stationary and background objects such as buildings and trees. The QORTEX software determines which of the detected objects initially are and remain stationary and masks these stationary objects as background objects from the list of objects within each refresh frame [i.e., frame-specific information, item (d)]. As long as the specific object remains stationary, it will remain masked. Should a background object subsequently move from its initial location, the QORTEX software would then list that specific object in the list of objects detected, starting with the relevant refresh frame.

The list of objects tracked by the QORTEX software is initialized every time a "relearn" command is received by the QORTEX software, e.g., when the system is first turned on or upon receipt of a user-generated "relearn command". Upon receipt of the relearn command, the list of objects being tracked (i.e., frame-specific information, item (d)) is cleared, and new frame-specific information and object-specific attributes are obtained for each subsequently-detected object, starting with the refresh scan occurring subsequent to receipt of the relearn command.

In the preferred embodiment, the police officer is able to generate a relearn command on demand from the user control interface, discussed with reference to FIG. 14A. Specifically, with reference to FIG. 14A, the plurality of on/off touch switches at 1404 includes a "Learn Background" switch that preferably generates the relearn command.

A relearn command is useful, e.g., whenever a police officer desires to surveille a new area or wishes to refresh a currently-surveilled area, such as at a traffic stop. In this way, the system is able to reset itself by disregarding all previously-tracked objects.

Given a 360° field of view and a range of up to 200 meters (at 80% reflectivity), the area coverable by LIDAR sensors 114a and 114b can exceed 125,000 square meters, and not all of the objects listed in frame-specific information, item (d) [hereafter, "listed objects" or "objects"], within this potential coverage area will necessarily be relevant as a threat to a police officer or police vehicle 101.

Accordingly, the present invention preferably filters the listed objects to focus on those objects that are potential threats to a police officer or police vehicle 101.

Specifically, the present invention preferably filters objects based on their location relative to a reference location, e.g., police vehicle 101. For example, objects such as people, animals, and vehicles detected by LIDAR unit 114 typically pose no threat to the police officer or the police vehicle where such objects are not located within a predetermined surveillance area of interest, relative to the police vehicle. For this reason, in the preferred embodiment, objects are filtered by the present invention based on whether those objects are located within a predetermined surveillance area of interest, referred to hereinafter as a "watch zone" or "zone". By definition, a watch zone comprises an area less than the area capable of being covered by LIDAR unit 114.

Figure 7:
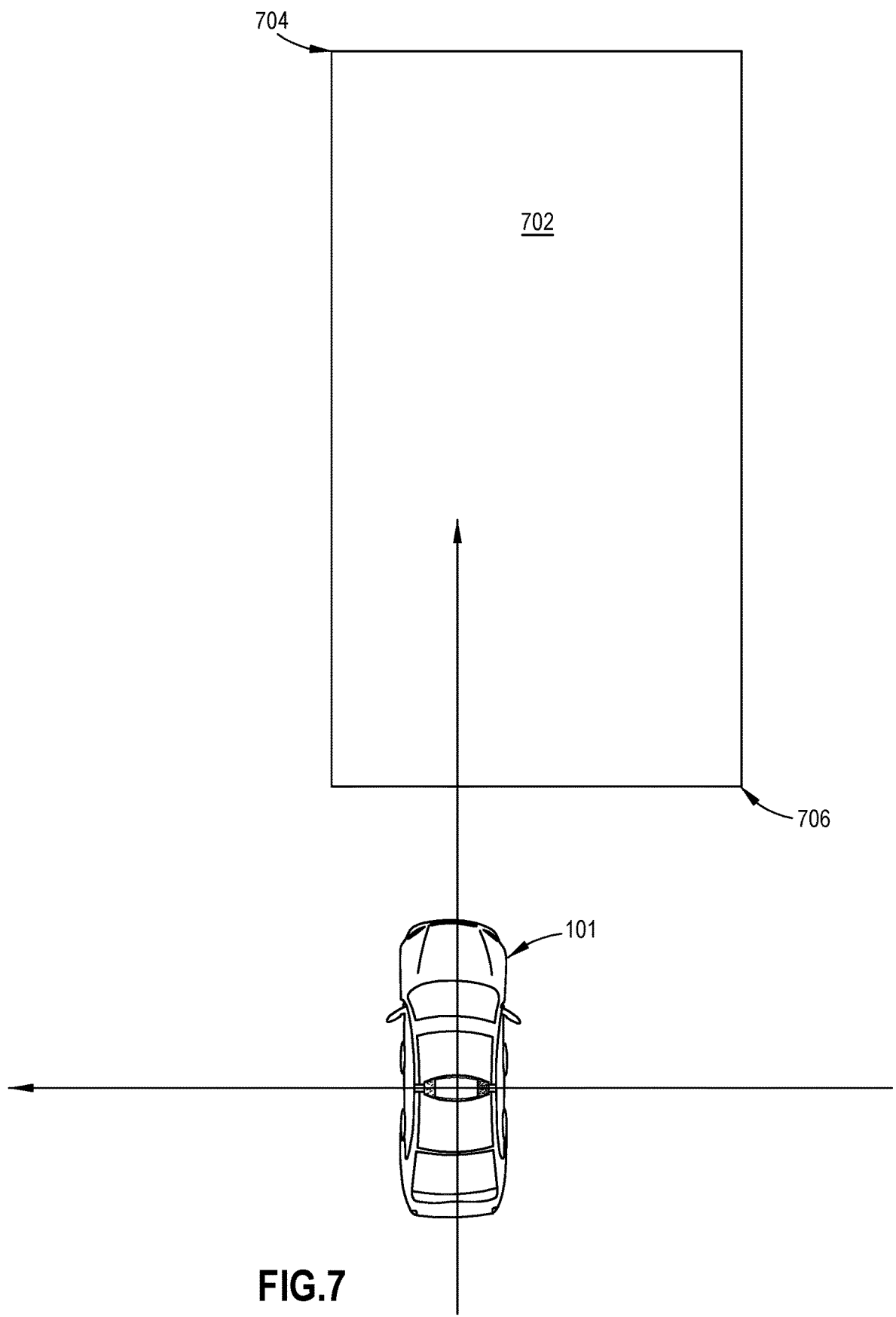
FIGS. 7 and 8 illustrate the two basic types of watch zones that can be created by the present invention for filtering objects detected by the LIDAR unit shown in FIG. 1.
Figure 8:
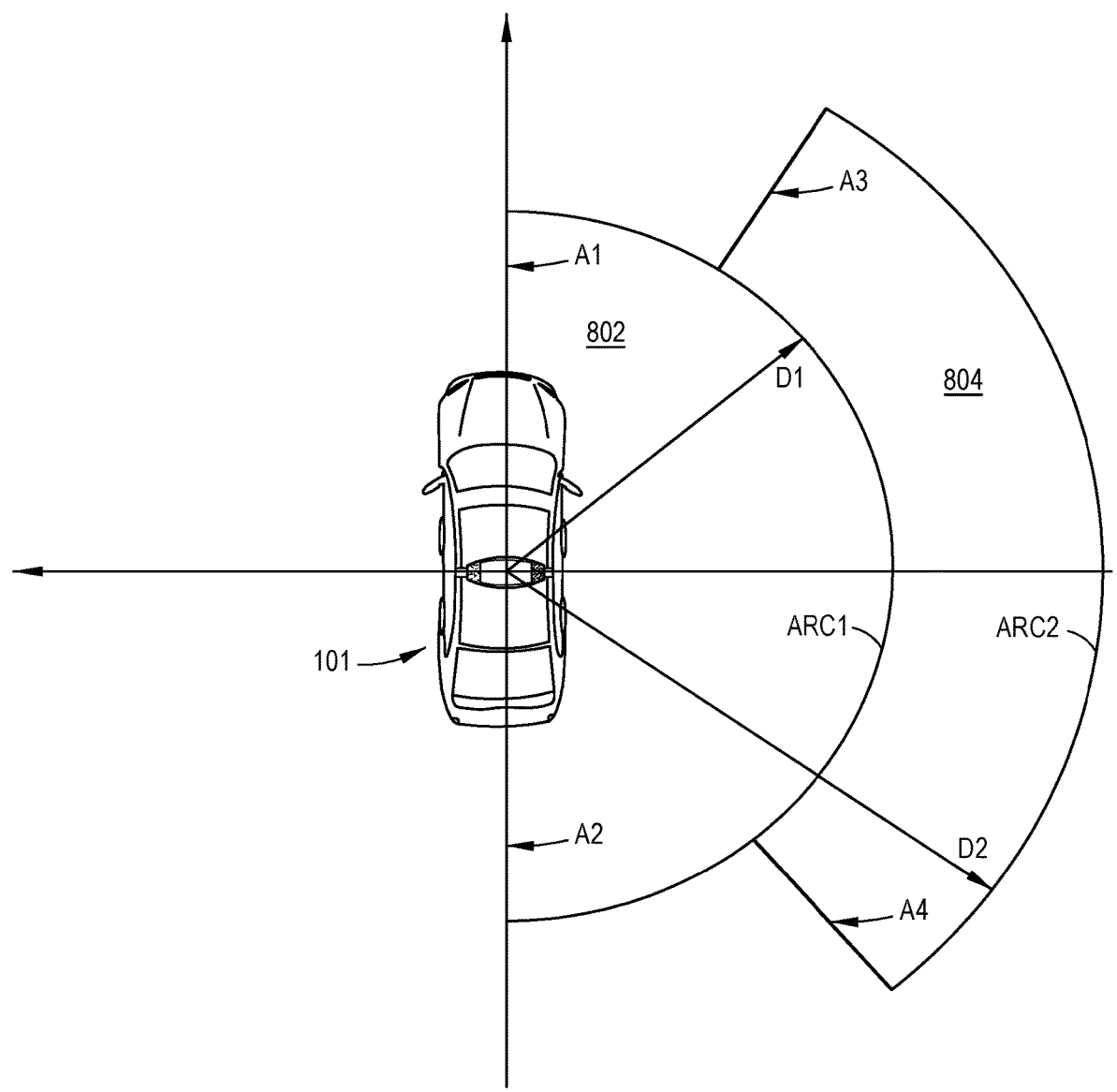

FIG. 7 and FIG. 8 illustrate the two basic types of watch zones that are capable of being created by the present invention for filtering objects detected by LIDAR unit 114, to wit, rectangular watch zones and polar watch zones, respectively.

With reference to FIG. 7, rectangular watch zones are preferably created using rectangular coordinates to specify points along an XY axis, allowing for rectangular-shaped watch zones. For example, rectangular watch zone 702 is preferably defined by specifying two points along the XY axis, e.g., top-left corner 704 and bottom-right corner 706. In the preferred embodiment, points 704 and 706 are measured relative to the center point of the XY axis (i.e., the 0, 0 coordinate), which is preferably set to the center of police vehicle 101.

With reference to FIG. 8, polar watch zones are preferably created using polar coordinates to specify a distance from a reference point and an angle from a reference direction to define an arc, allowing for circular, semi-circular, partially-circular and other circumferential-shaped watch zones. For example, polar watch zones 802 and 804 are preferably defined by specifying a start angle and an end angle relative to a reference direction, as well as the radius of the desired arc.

In the preferred embodiment, the start angle and end angle are measured relative to the −X-axis such that 0 degrees is at the 3 o'clock position on an XY axis. In the preferred embodiment, a polar watch zone can be defined by the area between the center point and an arc, or by the area between two concentric arcs.

For example, polar watch zone 802 is preferably defined as the area between arc ARC1 and the center of police vehicle 101. Arc ARC1 is defined by specifying distance D1 from the center of police vehicle 101, start angle A1 of 270 degrees and end angle A2 of 90 degrees. Polar watch zone 804 is defined as the area between arc ARC1 and arc ARC2, with arc ARC2 defined by specifying distance D2 from the center of police vehicle 101, start angle A3 of 300 degrees and end angle A4 of 60 degrees.

As discussed above with reference to FIGS. 7 and 8, watch zones are defined by specifying specific boundaries along the XY plane. While it is possible to create a three-dimensional watch zone having a Z-axis component, watch zones are preferably two-dimensional. For each watch zone created, the present invention preferably maps the boundaries of the watch zone in a watch-zone map specific to each watch zone.

In the preferred embodiment, and as discussed in more detail below with reference to FIGS. 8 through 12, the threat detection and notification system of the present invention evaluates the listed objects for threat assessment only if such objects are within a specified watch zone, and notifies a user group (e.g., the police officer and/or command center 105 (FIG. 1)) if an object within the watch zone matches a "watch mode" defined for that watch zone.

As used herein, the term "watch mode" refers to the set of predetermined criteria defining what constitutes a threat within a given watch zone, and the term "watch mode parameter" refers to each specific watch mode criteria.

In the preferred embodiment, multiple watch zones are capable of being created, and each watch zone is capable of having a different watch mode operable therewithin. Additionally, watch zones can overlap each other, either fully or partially. An object located within the overlapping portion of the watch zones is preferably evaluated based on the priority given to each watch zone relative to the other, as explained in more detail below.

Each watch mode can be uniquely configured via its associated watch mode parameters to define what does, and does not, constitute a threat within each particular watch zone.

The watch mode parameters of the present invention preferably include (1) the object's object type, (2) the object's current velocity, and (3) the object's current angle of approach relative to the reference point. In the preferred embodiment, the reference point is the center of police vehicle 101, as discussed above. The derivation of these watch mode parameters is now discussed.

An object's object type is preferably obtained from object-specific attribute item (ii) generated by the QORTEX software, which categorizes each object as "person", "vehicle" or "other", as discussed above. In the preferred embodiment, object type further includes "any", defined as any of the above object types, namely, "person", "vehicle" or "other", and "officer", discussed below with reference to FIG. 11. A user is preferably able to select any number of object-type values.

An object's current velocity is preferably calculable by the present invention by taking the distance the object traveled from the last refresh frame and dividing it by the time difference between refresh frames. The distance the object traveled from the last refresh frame is preferably obtained from object-specific attribute item (vi) generated by the QORTEX software, which is measured as $\Delta x$, $\Delta y$ and $\Delta z$, relative to the center of police vehicle 101, as discussed above. While it is possible to calculate current velocity in three-dimensional space using the $\Delta x$, $\Delta y$ and $\Delta z$ components, the object's current velocity is preferably calculated two-dimensionally using the $\Delta x$ and $\Delta y$ components. Trigonometric formulae for calculating velocity in two-dimensional space are known in the art. As discussed above, the time difference between refresh frames is based on the refresh scan rate. For a scan rate of 10 cycles/second, the time difference between refresh frames is 0.1 seconds. As will be appreciated, since the current velocity of each object within a watch zone is calculable at each refresh scan, and since a refresh scan occurs every 0.1 seconds (based on a refresh scan rate of 10 cycles/second), the velocity calculation for each object can be considered as the object's instantaneous velocity.

An object's current angle of approach is preferably calculable by the present invention as now discussed with reference to FIG. 12, which illustrates a pedestrian walking near police vehicle 101 at three points in time.

Figure 12:
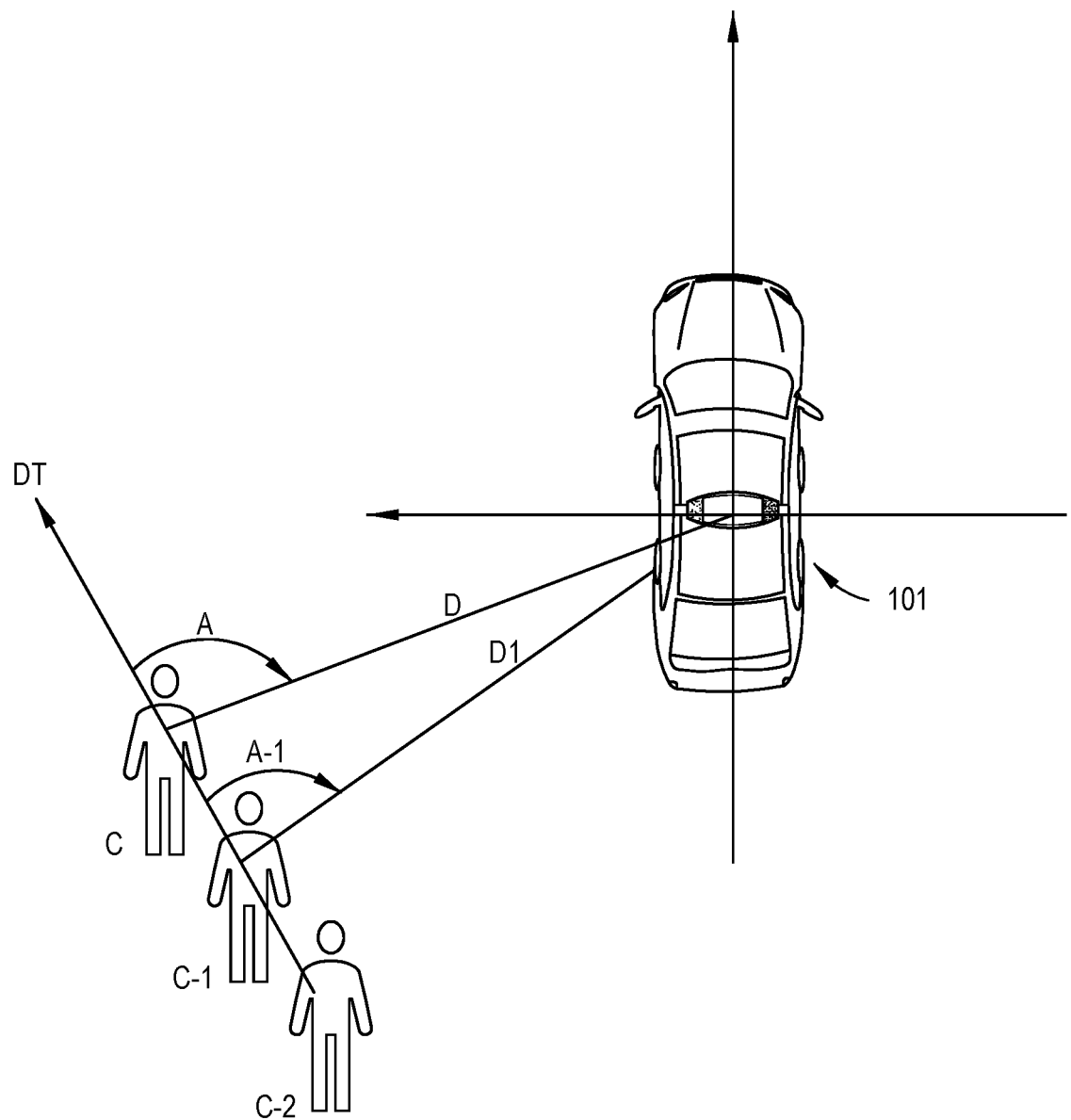
FIG. 12 illustrates a pedestrian walking near police vehicle 101 at three points in time.

Turning now to FIG. 12, a pedestrian is shown walking in the direction of direction of travel vector DT at three points in time, to wit, current position C, defined as the time of the current (i.e., most-recent) refresh scan, position C-1, defined as the time of the refresh scan that occurred one cycle ago, and position C-2, defined as the time of the refresh scan that occurred two cycles ago.

Each object's current direction of travel vector DT is preferably calculable by the present invention using two location points, namely, the object's position at the current refresh scan and the object's position at the time of the refresh scan that occurred one cycle ago. For ease of explanation, the pedestrian's direction of travel vector between positions C-2 and C-1, as well as between positions C-1 and C, are shown in FIG. 12 as the same direction of travel, to wit, vector DT.

In the preferred embodiment, the object's most-current direction of travel vector DT is desired, given that any change in the object's direction of travel towards police vehicle 101 may impact the safety of the police officer and/or police vehicle 101. For this reason, direction of travel vector DT is preferably calculated based on the position of the object at its current position C and the position of the object at its last-known position C-1. Calculating direction of travel vector DT using any two other positions (e.g., C and C-2), or based on other object-tracking criteria, will be apparent to one skilled in the art.

At refresh scan C-1, pedestrian is at position C-1 and the present invention preferably calculates the pedestrian's current angle of approach relative to the center of police vehicle 101 as follows: (1) determine the pedestrian's direction of travel vector DT based on pedestrian's position at C-1 and pedestrian's position at C-2; (2) determine distance vector D-1 between the center of police vehicle 101 and the pedestrian's position at C-1; and (3) calculate angle A-1 between direction of travel vector DT and distance vector D-1.

Similarly, at the time when pedestrian is at position C, the pedestrian's angle of approach relative to the center of police vehicle 101 is preferably calculated by the present invention as follows: (1) determine the pedestrian's direction of travel vector DT based on pedestrian's position at C and pedestrian's position at C-1; (2) determine distance vector D between the center of police vehicle 101 and the pedestrian's position at C; and (3) calculate angle A between direction of travel vector DT and distance vector D.

The position of the pedestrian at C, C-1 and C-2 is preferably obtained from object-specific attribute item (iii) generated by the QORTEX software, which is measured in xyz coordinates, relative to the center of police vehicle 101, as discussed above. While it is possible to calculate direction of travel vector DT and/or distance vectors D and D-1 using two points (e.g., for direction of travel vector DT, pedestrian's position at C and C-1; and for distance vectors D and D-1, the center of police vehicle 101 and pedestrian's position at C and C-1, respectively) in three-dimensional space, direction of travel vector DT and distance vectors D and D-1 are preferably calculated two-dimensionally using the relevant x and y components. Trigonometric formulae for calculating a vector using two points in two-dimensional space, as well as for calculating the angle between two such vectors, are known in the art.

As will be appreciated, since direction of travel vector DT and distance vectors D and D-1 of each object, together with the angle therebetween, are calculable at each refresh scan, and since a refresh scan occurs every 0.1 seconds (based on a refresh scan rate of 10 cycles/second), the current angle of approach for each object can be considered to be the object's instantaneous angle of approach.

For an object moving directly towards the center of police vehicle 101, the angle of approach is preferably defined as zero degrees, and for an object moving directly away from the center of police vehicle 101, the angle of approach is preferably defined as 180 degrees.

As can be seen from FIG. 12, the pedestrian's angle of approach A-1 at position C-1 is approximately 85°, while the pedestrian's angle of approach A at position C is approximately 95°. Given that the pedestrian is traveling away from police vehicle 101, the angle of approach is increasing. The converse will also be true.

The present invention preferably determines an object's current velocity and current angle of approach, as discussed above, as the indicants of motion most relevant to a police officer. In this way, the most-current movement towards police vehicle 101 will be available to determine whether an alert condition is present. Other indicants of motion, such as the object's average velocity or average angle of approach, taken over a time period longer than two cycles or as a rolling average over a plurality of cycles, will be apparent to one skilled in the art.

The three preferred watch mode parameters discussed above are summarized in Table 3, below.

TABLE 3

Watch Mode Parameters

Object type
["person", "vehicle", "other", "any", "officer"]
Current velocity
Current angle of approach The specific value for each of the watch mode parameters associated with each watch zone are preferably set by the user, based on the user's criteria of what constitutes a threat within each particular watch zone.

Figure 13:
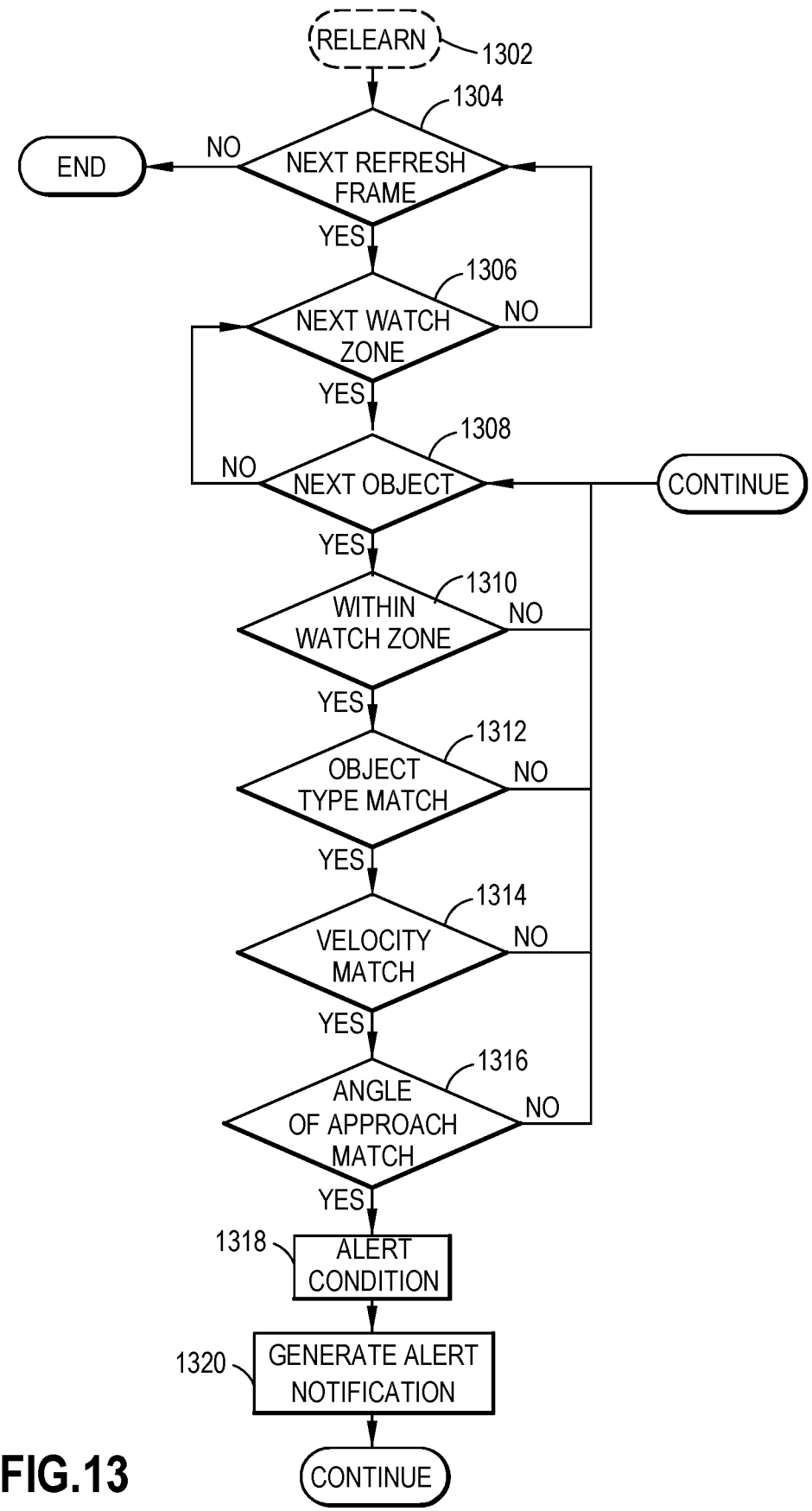
FIG. 13 is a flow diagram of evaluating the LIDAR data for each object.

LIDAR alert engine 110e (FIG. 1) preferably evaluates each object for threat-assessment based on the watch zone parameters set for each watch zone, as shown with reference to FIG. 13.

Turning now to FIG. 13, a preferred embodiment of the flow diagram for evaluating each object for threat-assessment by LIDAR alert engine 110e is shown. As discussed above, the receipt of a relearn command at 1302 initializes the list of objects made available from the QORTEX software (i.e. frame-specific information, item (d)). It is to be understood that receipt of a relearn command is not necessary to commence threat-assessment evaluation. However, whenever a relearn command is received, the list of objects is initialized and threat-assessment evaluation commences anew.

Objects are preferably processed at 1304 on a frame-by-frame basis based on the watch zone under evaluation. As discussed in more detail below with reference to Examples 1 through 5, where multiple watch zones have been established, they are ranked in order of priority of threat-assessment, and this order is preferably followed at 1306.

In the preferred embodiment, the object under evaluation at 1308 is evaluated at 1310 to determine if the position of that object is within the watch zone. Specifically, the position of that object, preferably obtained from the QORTEX software as object-specific attribute, item (iii), is compared with the watch-zone map created by the present invention for the watch zone under evaluation. While the object's positional information is made available from QORTEX as a three-dimensional coordinate, the z-axis coordinate is preferably masked such that the position of the object in the XY plane is compared with the two-dimensional watch-zone map.

If the object is within the watch zone, the object is further evaluated at 1312 to determine if the object's object type matches any of the object type values set by the user as a watch mode parameter for that watch zone.

If the object's object type matches any of the object type values set by the user, the object is further evaluated at 1314 to determine if the object's current velocity matches the current velocity value set by the user as a watch mode parameter for that watch zone. Specifically, the object's current velocity is calculated at this point, as discussed above with reference to Table 3, and that result is compared with the current velocity value set by the user as a watch mode parameter for that watch zone. A match will be deemed to occur if the object's current velocity is equal to or greater than the current velocity value set by the user as a watch mode parameter for that watch zone.

If the object's current velocity matches the current velocity value set by the user, the object is further evaluated at 1316 to determine if the object's angle of approach matches the angle of approach value set by the user as a watch mode parameter for that watch zone. Specifically, the object's angle of approach is calculated at this point, as discussed above with reference to Table 3, and that result is compared with the angle of approach value set by the user as a watch mode parameter for that watch zone. A match will be deemed to occur if the object's angle of approach is equal to or less than the angle of approach value set by the user as a watch mode parameter for that watch zone.

If the object is not within the watch zone (at 1310), or if the object's object type does not match any of the object type values set by the user (at 1312), or if the object's current velocity does not match the current velocity value set by the user (at 1314), or if the object's angle of approach does not match the angle of approach value set by the user (at 1316), then the next object in the list is selected at 1308 for evaluation at 1310-1316.

However, in the event the object is within the watch zone (at 1310), and the object type matches any of the object type values set by the user (at 1312), and the object is moving at least as fast as the preset current velocity value (at 1314); and the object is moving towards the police vehicle 101 (as defined by an angle of approach equal to or less than the angle of approach value set by the user) (at 1316), then the object is deemed to be a threat, and an alert condition is generated at 1318 and LIDAR alert engine 110e (FIG. 1) preferably notifies a user group (e.g., the police officer via radio 101g, terminal 101d and/or PA system 101c, and/or command center 105, FIG. 1), as discussed in more detail with reference to Examples 1 through 5 below.

The process discussed above with reference to 1308-1320 continues until all objects within the frame have been examined, at which point all objects within the frame are examined according to the next watch zone (at 1306) until all watch zones have been examined, at which point examination of the objects in the next frame (at 1304) commence to be evaluated.

The LIDAR threat-assessment methodology discussed above with reference to FIG. 13 continues until the user terminates the process. Specifically, with reference to FIG. 14A, the plurality of on/off touch switches at 1404 includes "LIDAR Analytics" switch that preferably disables the LIDAR analytics analysis discussed above with reference to FIG. 13. When the "LIDAR Analytics" switch is touched again, a relearn command is preferably generated, thereby initializing the list of objects tracked by the QORTEX software, as discussed above.

By initially evaluating whether an object is within the watch zone (at 1310), the present invention filters out all objects for threat assessment except those that are deemed likely to pose a threat to the police officer or police vehicle 101 (FIG. 1).

Additionally, by calculating an object's current velocity (at 1314) and angle of approach (at 1316) only when necessary, the present invention is able to operate more efficiently.

While the preferred LIDAR threat-assessment methodology has been described above with reference to FIG. 13, any rearrangement of the processing order of references 1310, 1312, 1314 and/or 1316 will achieve the same result, albeit less efficiently.

In an alternative embodiment, current velocity is neither a watch mode parameter nor a calculable indicant of motion evaluated by the methodology shown with reference to FIG. 13. In this alternative embodiment, only the object's location within a watch zone, its object type and its angle of approach would be relevant in assessing whether that object is a potential threat.

Other evaluation methodologies will be apparent to one skilled in the art, based on the teachings of the present invention.

Specific examples are now discussed with reference to FIGS. 8 through 11, which illustrate various watch zone configurations for use in different surveillance scenarios. It is noted that all measurement units in the following Examples are metric, e.g., distance in meters and velocity in meters/second, except as otherwise noted.

EXAMPLE 1

With reference to FIG. 8, watch zone 802 defines an area closer to police vehicle 101, relative to watch zone 804. In this Example 1, it is assumed that any object within watch zone 802 is a potential threat, while any object within watch zone 804 is a potential threat only if it is approaching police vehicle 101.

Based on these assumptions: the watch mode for watch zone 802 is concerned about any object, regardless of its distance, current velocity or angle of approach; and the watch mode for watch zone 804 is concerned about any object, but only if that object is moving at some minimum velocity towards police vehicle 101.

Accordingly, the watch mode parameters for watch zone 802 are preferably set as follows:
  object type="any", which allows object types "person", "vehicle" and "other" located within watch zone 802 to be further evaluated;
  current velocity=0, which allows "any" object within watch zone 802 to be further evaluated, regardless of its velocity if its speed is equal to or greater than 0.25 meters/second (the equivalent of about 0.82 feet/second); and
  angle of approach=180 degrees, which allows "any" object within watch zone 802 having a speed equal to or greater than zero to be deemed a potential threat if its angle of approach is equal to or less than 180°, i.e., regardless of that object's direction of travel, whether towards or away from police vehicle 101 (FIG. 1).

While it might initially occur to a user to set the current velocity value for watch zone 802 to zero, thereby further evaluating any moving object, doing so might cause the rustling of leaves by the wind to become an object evaluated beyond 1314 (FIG. 13). To avoid any unnecessary calculation at 1316 (FIG. 13), it is preferable to set the current velocity value in most situations to at least 0.25 m/s.

The watch mode parameters for watch zone 804 are preferably set as follows:
  object code="any";
  current velocity=0.5, which allows "any" object within watch zone 804 to be further evaluated if its speed is equal to or greater than 5 m/s; and
  angle of approach=90 degrees, which allows "any" object within watch zone 804 having a speed equal to or greater than 0.5 m/s to be deemed a potential threat if its angle of approach is equal to or less than 90 degrees, i.e., moving towards police vehicle 101 (FIG. 1).

In Example 1, any object within watch zone 802 will be deemed a threat, while any object within watch zone 804 will be deemed a threat only if that object is moving at or above a speed of 0.5 m/s and is moving towards police vehicle 101 (FIG. 1).

In the preferred embodiment, watch zone 802 has a higher priority than watch zone 804, given its closer proximity to police vehicle 101 relative to watch zone 804. By ranking watch zone 802 above watch zone 804 (see, FIG. 13, reference 1306), objects in watch zone 802 will be evaluated before objects in watch zone 804. As a result of ranking the watch zones, objects in watch zone 802 will be analyzed before objects in watch zone 804.

LIDAR threat-assessment methodology, discussed above with reference to FIG. 13, will evaluate all objects matching the watch modes associated with watch zones 802 and 804, and any alert condition generated at 1318 (FIG. 13) causes LIDAR alert engine 110e to (FIG. 1) notify the police officer via radio 101g, terminal 101d and/or PA system 101c, and/or command center 105, FIG. 1.

The alert sent to terminal 101e can be, for example, a text message, notifying the police officer inside police vehicle 101 that an object has been evaluated to be a threat. This text message can be displayed, e.g., within text display box 1412 of the user control interface, shown with reference to FIG. 14A. The text message to terminal 101d is preferably in addition to the display of streaming video at 1406 (FIG. 14A), discussed above.

Further, the alert can also be, for example, an audible alert, such as a "beep" or other sound capable of signifying an alert, either to terminal 101d, PA system 101c or radio 101g. In the preferred embodiment, the audible alert is a directional indicator of the object's location. Specifically, the object's current position in xyz coordinates relative to police vehicle 101 (FIG. 1), preferably obtained from object-specific attribute (iii), discussed above, is converted to radians, and this radians value is used as an index into a look-up table to determine the position of the object in an analog clock coordinate system with the front of police vehicle at 12 o'clock, as viewed from a top of police vehicle 101. Thus, an object located at the front center of police vehicle 101 will preferably generate an audible alert of "12 o'clock", while an object located at the rear center of police vehicle 101 will preferably generate an audible alert of "6 o'clock". In this way, the police officer can receive audible alerts indicating the relative position of the object evaluated at FIG. 13 to be a potential threat.

This audible alert is preferably sent to PA system 101c, as well as to terminal 101d. With reference to FIG. 14A, the positional information of all objects located within any of the selected watch zones is received by user control interface 1400, which preferably displays each object's location within positional map 1410, thereby mapping where the object is located relative to the front of police vehicle 101 (FIG. 1), indicated on positional map 1410 as triangle 1410a.

Positional map 1410 is preferably scalable, that is, the amount of area seen by positional map 1410 can be increased or decreased to show more or less area around police vehicle 101, respectively. In the preferred embodiment, the scale is able to be increased or decreased by sliding-scale touch switch 1408 located directly above positional map 1410. Sliding-scale touch switch 1408 allows the scale of positional map 1410 to adjust from, e.g., a radius of 30 meters to a radius of 150 meters, measured from the center of triangle 1410a to perimeter ring indicator 1410b.

The audible alert can optionally also be sent to radio 101g.

Command center 105 (FIG. 1) is preferably notified of an alert condition in the event the alert condition is present for a predetermined amount of time, e.g., five minutes, which might indicate that the potential threat condition has not been timely resolved and the officer may need assistance. Additionally, command center 105 is preferably notified of an alert condition in the event at least a predetermined number of objects, e.g., three, within one watch zone are evaluated to be a threat, which might indicate that the officer is outnumbered and may need assistance. In either event, LIDAR alert engine 110e preferably makes an appropriate alert and/or live streaming video available to command center 105 for its real-time review and evaluation.

EXAMPLE 2

Figure 9:
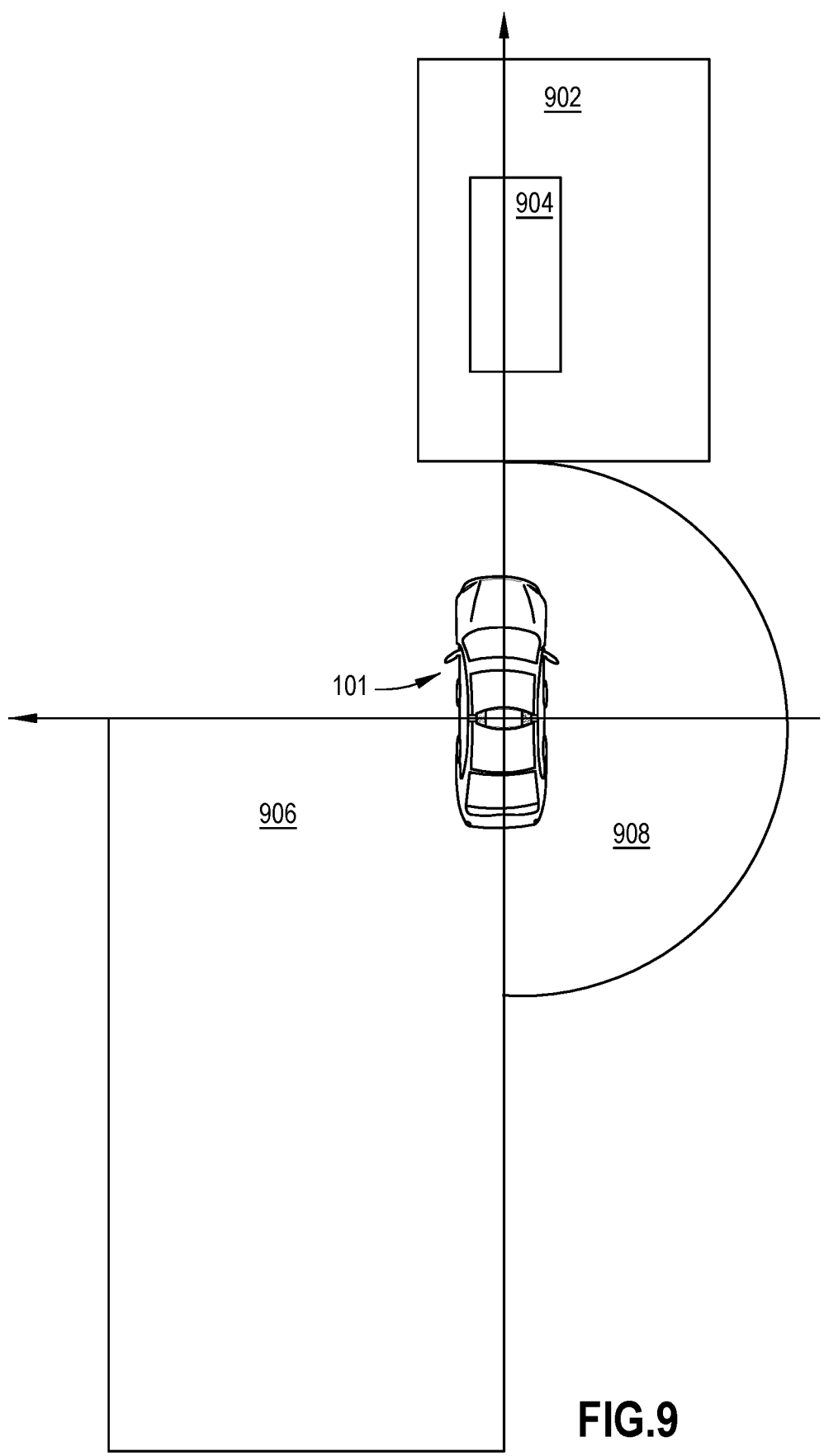
FIGS. 9 through 11 illustrate various watch zone combinations for use in different surveillance scenarios.

Turning now to FIG. 9, multiple watch zones are configured in an arrangement suitable for use in routine traffic-stop scenarios. Specifically, watch zone 902 defines an area capable of encompassing target vehicle 904 located in front of police vehicle 101 (the typical position of both target vehicle 904 and police vehicle 101 during a routine traffic stop), watch zone 906 defines an area encompassing the left-rear quadrant behind police vehicle 101 and is capable of including vehicles traveling along the roadway (not shown) on the left-side of police vehicle 101, as well as anyone that may approach from the rear of police vehicle 101, and watch zone 908 defines an area establishing a perimeter on the left side of police vehicle 101 and is capable of including anyone that may approach from the right side of police vehicle 101.

In this Example 2, it is assumed that any object within watch zone 902 (such as the driver or any passenger of target vehicle 904, or target vehicle 904 itself) is a potential threat, while any object within watch zones 906 and 908 is a potential threat only if it is approaching police vehicle 101.

Based on these assumptions: the watch mode for watch zone 902 is concerned about any object, regardless of its distance, current velocity or angle of approach; and the watch mode for watch zones 906 and 908 is concerned about any object, but only if that object is moving at some minimum velocity towards police vehicle 101.

In this Example 2, watch zone 902 has the highest priority, followed by watch zone 908 and then watch zone 906, based on the assumption that the greatest probable threat will be from someone inside target vehicle 904 or target vehicle 904 itself, followed by a person approaching from the right side of police vehicle 101, followed by a vehicle or person approaching from the rear. Thus, objects in watch zone 902 will be analyzed before objects in watch zone 908, and objects in watch zone 908 will be analyzed before objects in watch zone 906.

Accordingly, the watch mode parameters for watch zone 902 are preferably set as follows:
object type="any";
current velocity=0.25; and
angle of approach=180 degrees.

The watch mode parameters for watch zones 908 and 906 are preferably set as follows:
object code="any";
current velocity=0.50; and
angle of approach=90 degrees.

Any object located in the area where watch zone 902 and watch zone 908 overlap will first be evaluated in accordance with the watch mode associated with watch zone 902, and then in accordance with the watch mode associated with watch zone 908, since watch zone 902 has a higher priority than watch zone 908.

LIDAR threat-assessment methodology, discussed above with reference to FIG. 13, will evaluate all objects matching the watch modes associated with watch zones 902, 908 and 906, and any alert condition generated at 1318 (FIG. 13) causes LIDAR alert engine 110e to (FIG. 1) notify the police officer via radio 101g, terminal 101d and/or PA system 101c, and/or command center 105, FIG. 1, as discussed above with reference to Example 1.

It is noted that, in the event target vehicle 904 attempts to flee the scene, the LIDAR threat-assessment methodology of FIG. 13 will generate an alert because an object within watch mode 902, to wit, target vehicle 904, will have a current velocity equal to or greater than 0.25 m/s and an angle of approach equal to or less than 180 degrees.

EXAMPLE 3

With reference to FIG. 9, in the event the police officer of police vehicle 101 desires to establish a watch zone to monitor traffic that may be traveling at an excessive speed along a roadway, watch zone 906 can be configured to encompass the entire width or just a specific lane of the roadway (not shown) located on the left-side of police vehicle 101, to monitor traffic moving in the same direction in which police vehicle 101 is facing.

Accordingly, the watch mode parameters for watch zone 906 are preferably set as follows:
object type="vehicle";
current velocity=the posted speed limit, plus a buffer, if desired (e.g., 9 miles/hour for highway conditions, or 0 miles/hour for a residential area or school zone); and
angle of approach=90 degrees (i.e., traveling towards police vehicle 101).

LIDAR threat-assessment methodology, discussed above with reference to FIG. 13, will evaluate all vehicles within watch zone 906, and generate an alert condition at 1318 (FIG. 13) in the event a vehicle's speed exceeds the current velocity value set above.

Given that the speeding vehicle's current velocity is calculable at every refresh scan, the present invention is capable of sending a notification to the police officer (preferably via terminal 101d (FIG. 1) at 1412 (FIG. 14A)) at every refresh scan. In the preferred embodiment, the text alert sent to terminal 101d (FIG. 1) at 1412 (FIG. 14A) will include the calculated current velocity of the speeding vehicle at every relevant frame, together with the highest current velocity calculated for that vehicle.

In this Example 3, an alert condition is generated only when the current velocity of a vehicle traveling through watch zone 906 meets or exceeds the set current velocity value. In this way, only those vehicles traveling at or above the threshold velocity value will be brought to the police officer's attention.

Given that both LIDAR data and streaming video is preferably stored in storage 110*b* (FIG. 1), documentary evidence of the speed of the vehicle is available post-event, should the need arise.

EXAMPLE 4

With reference again to FIG. 9, in the event the police officer of police vehicle 101 desires to establish watch zone 906 to monitor both (i) moving vehicles that may be traveling at an excessive speed along a roadway (i.e., as discussed above with reference to Example 3), as well as (ii) any person that approach police vehicle from within the area created by watch zone 906, the police officer would preferably create two identical watch zones 906, each overlapping the other.

The first watch zone 906 would monitor moving vehicles that may be traveling at an excessive speed along a roadway, and its watch mode would preferably be configured as discussed above with reference to Example 3.

The second watch zone 906 would monitor any person that may come up to police vehicle from within the area created by watch zone 906, and its watch mode would preferably be configured as follows: object type="person"; current velocity=0.25; and angle of approach=90.

In this Example 4, second watch zone 906 has a higher priority over first watch zone 906, based on the assumption that a person attempting to approach from the rear is a greater threat than vehicles traveling along a roadway.

Given the complete overlap in watch zones, the present invention preferably distinguishes between the alert for "person" and the alert for "vehicle". For example, the alert for "person" can be an audible alert, while the alert for a speeding vehicle can be the text alert sent to terminal 101*d* (FIG. 1) at 1412 (FIG. 14A) as discussed with reference to Example 3. Other alert options will be obvious to one skilled in the art.

EXAMPLE 5

Figure 10:
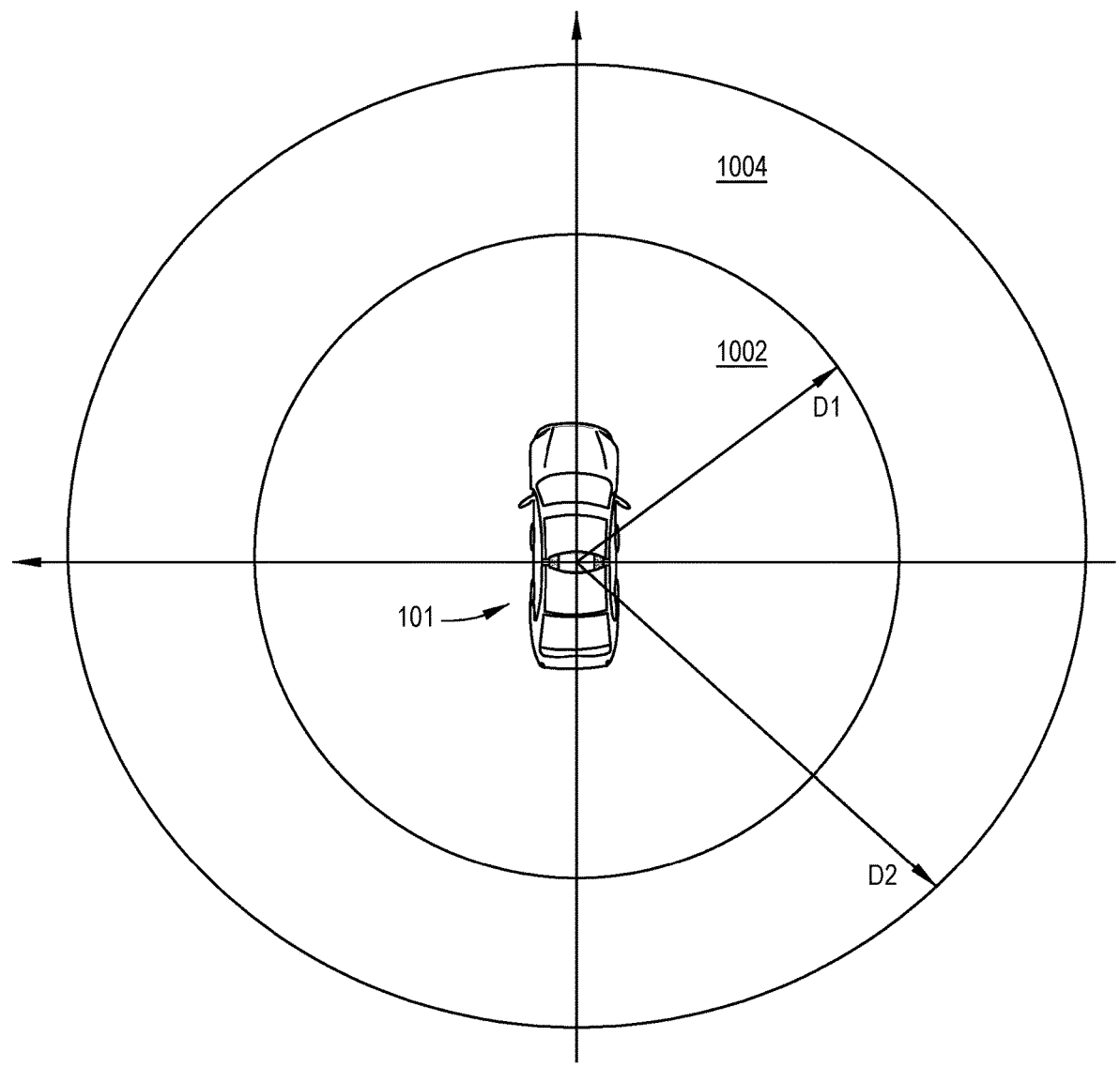

Turning now to FIG. 10, multiple watch zones are configured in an arrangement suitable where the police officer is stationary, whether to observe an area, to interact with terminal 101*d*, or some other reason.

Watch zone 1002 establishes a first perimeter around police vehicle 101, while watch zone 1004 establishes a second perimeter therearound.

In this Example 5, it is assumed that any object within watch zone 1002 is a potential threat, while any object within watch zone 1004 is a potential threat only if it is approaching police vehicle 101.

Based on these assumptions: the watch mode for watch zone 1002 is concerned about any object, regardless of its distance, current velocity or angle of approach; while the watch mode for watch zone 1004 is concerned about any object, but only if that object is moving at some minimum velocity towards police vehicle 101.

In the preferred embodiment, watch zone 1002 has a higher priority than watch zone 1004, as discussed above with reference to Example 1, and objects in watch zone 1002 will be analyzed before objects in watch zone 1004.

The watch mode parameters for watch zone 1002 are preferably set as follows:
object type="any";
current velocity=0.25; and
angle of approach=180 degrees.

The watch mode parameters for watch zone 1004 are preferably set as follows:
object type="any";
current velocity=0.50; and
angle of approach=90 degrees.

LIDAR threat-assessment methodology, discussed above with reference to FIG. 13, will evaluate all objects within watch zone 1002 and then watch zone 1004, and generate an alert condition at 1318 (FIG. 13) in the event any object is within watch zone 1002 and/or any object within watch zone 1004 is moving towards police car 101.

The alert notifications for watch zones 1002 and 1004 are preferably an audible "o'clock" alert and corresponding graphic on positional map 1410 (FIG. 14A), thereby allowing the police officer to quickly locate the object and not be taken by surprise.

EXAMPLE 6

Figure 11:
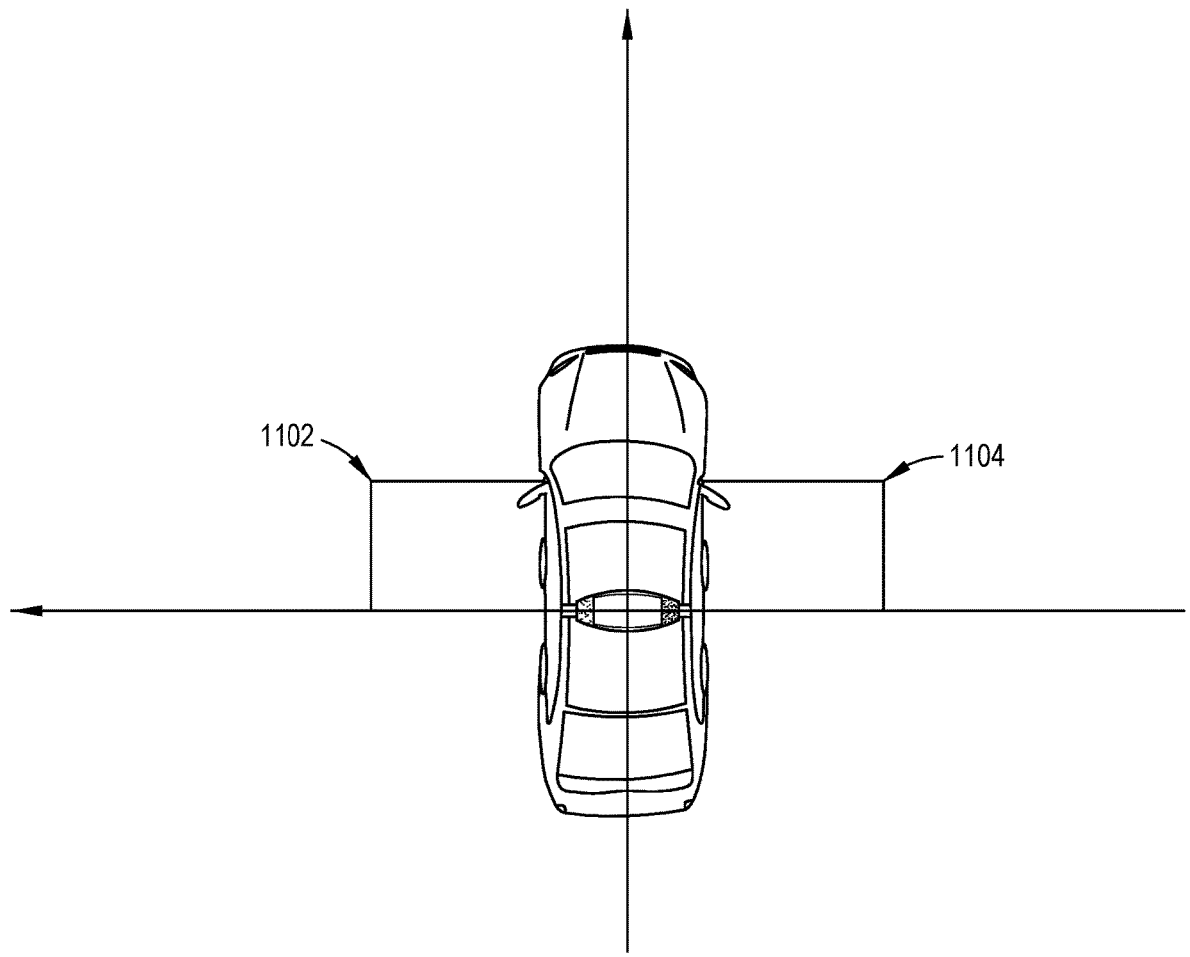

Turning now to FIG. 11, first "officer" watch zone is shown at 1102, preferably encompassing an area covering, on the Y-axis, the driver's front door, and on the X-axis, the maximum distance the driver's front door opens, thereby covering the area in which a police officer driving police vehicle 101 would first appear outside police vehicle 101.

Optional second "officer" watch zone, encompassing the passenger's front door, is shown at 1104 and is preferably parallel to watch zone 1102, covering the area in which a second police officer, such as the driver's partner, would first appear outside police vehicle 101.

The present invention preferably defines any object first detected in first officer watch zone 1102 or second officer watch zone 1104 as the police officer (i.e., object type "officer") and tracks each officer independently, even if they leave their respective watch zones. This allows each officer to exit police vehicle 101 without being tracked or evaluated by the present invention for threat assessment by LIDAR alert engine 110*e*.

While it is possible to track a police officer using facial recognition [via camera unit 102 (FIG. 1)], the preferred embodiment employs officer watch zones 1102 and 1104 inasmuch as LIDAR unit 114 (FIG. 1) is not compromised by, e.g., low-light or other adverse environmental conditions.

With reference to FIG. 1, it should be noted that video alert engine 110*c*, audio alert engine 110*d* and LIDAR alert engine 110*e* are capable of each working simultaneously. In the event two or more alerts are generated that require terminal 101*d*, such as text display box 1412 of user control interface 1400 (FIG. 14A), same is preferably configured to allow multiple areas for notifications generated by video alert engine 110*c*, audio alert engine 110*d*, and LIDAR alert engine 110*e* to be displayed on a separate and dedicated portion thereof, e.g., one underneath the other. Optionally, the text displayed in each such area of text display box 1412 can be color-coded, e.g., blue text for alerts from video alert engine 110*c*, red text for alerts from audio alert engine 110*d*, and green text for alerts from LIDAR alert engine 110*d*, thereby assisting the user in determining, at a glance, the source of the particular alert (e.g., blue text for video alerts, red text for audio alerts, and green text for LIDAR alerts).

In the event two or more audible alerts are generated simultaneously that require the same device, such as PA system 101c or radio 101g, such audible notifications are preferably prioritized based on source (e.g., LIDAR alert engine notifications are heard before video alert engine notifications, which are heard before audio alert engine notifications). Other simultaneous-alert methodologies are possible.

Alternatively, the higher-priority notification can be heard on PA system 101c, while the lower-priority notification can be heard on radio 101g. For example, a simultaneous alert from LIDAR alert engine 110d and video alert engine 110c could be prioritized as follows: the alert from LIDAR alert engine 110e would be heard over PA system 101c, while the alert from video alert engine 110c would be heard over radio 101g.

Alternatively, audible alerts can be prioritized based on the type of notification. Specifically, each possible audible alert is prioritized and alerts higher in priority are heard before alerts lower in priority. For example, "gun" from video alert engine 110c would have a higher priority over "person" or "1:00 o'clock" from LIDAR alert engine 110e, and would therefore be announced first, should both alerts occur simultaneously.

Alternatively, the audible alerts can be prioritized to allow simultaneous audible alerts to be heard on different devices, e.g., an audible alert from LIDAR alert engine 110e can be announced on PA system 101c, while the simultaneous alert from video alert engine 110c can be announced on radio 101g.

As will be appreciated by those skilled in the art, the present invention acts as both a force multiplier and an objective backup to the police officer. Specifically, by alerting both the police officer and the command center of alert notifications in the field, and by doing so independently of the police officer, the present invention acts as a backup to the police officer, regardless of how many other officers may be on the scene and regardless of any environmental conditions (such as chaos or confusion) that may be present at the scene.

Additionally, the present invention provides an over-watch function, independent of the police officer, by allowing the police officer to focus on the tasks at hand while allowing the present invention to monitor the scene for potential threats and alert the police officer to any threats detected, and to do so in a manner calculated to specifically communicate the nature of the threat to the police officer.

Furthermore, the police officer is capable of being at one location and police vehicle 101 at another location, with both locations being monitored for alert conditions (i.e., the police officer monitoring his or her location, and the present invention monitoring the location of the police vehicle).

Moreover, the present invention allows monitoring of the scene by a remote command center when certain types of alert conditions occur in the field, providing further over-watch and support functionality to the police officer in the field.

With reference to FIG. 14A, the preferred layout of the multi-view screen of the user control interface capable of being displayed on the monitor (not shown) of terminal 101d is shown.

User control interface 1400 preferably comprises a plurality of on/off touch switches at 1402 to allow the user to select from previously-defined watch zone/watch mode configurations, for example: "OFFICER TRACKING" which identifies and tracks the movement of the officer(s); "WATCH ALL 25 m" which is a 25 m polar watch zone that tracks object types "any" (which includes object types "person", "vehicle" and "other", as discussed above); "WATCH ALL 50 m" which is a 50 m polar watch zone that tracks object types "any"; "WATCH ALL 12-6 25 m" which is a semi-circular 25 m polar watch zone from the 12 o'clock to the 6 o'clock position (see, 1410) that tracks object types "any"; "WATCH ALL 7-9 50 m" which is a semi-circular 50 m polar watch zone from the 7 o'clock to the 9 o'clock position, suitable for speed-limit detection on the driver's side of police vehicle 101 (FIG. 1); "WATCH ALL 3-6 50 m" which is a semi-circular 50 m polar watch zone from the 3 o'clock to the 6 o'clock position, suitable for speed-limit detection on the passenger's side of police vehicle 101 (FIG. 1); "WATCH ALL 6-9 50 m" which is a semi-circular 50 m polar watch zone from the 6 o'clock to the 9 o'clock position; "WATCH ALL 9-12 100 m" which is a semi-circular 100 m polar watch zone from the 9 o'clock to the 12 o'clock position; and "VEHICLE 9-12 100 m" which is a semi-circular 100 m polar watch zone from the 9 o'clock to the 12 o'clock position, suitable for speed-limit detection on the driver's side of police vehicle 101 (FIG. 1) with oncoming traffic.

In the preferred embodiment, previously-created user-defined watch zone/watch mode configurations are available at 1402 for selection, via the scroll bar, allowing the user to quickly select a predefined watch mode/watch mode configuration while in the field. Other watch zone/watch mode configurations are creatable by the user, as discussed below with reference to FIG. 14B.

The on/off touch switches at 1404 are preferably the system controls. Specifically, "LEARN BACKGROUND" preferably generates the relearn command to initialize the objects being tracked, as discussed above.

"DISARM SYSTEM" preferably turns the entire system off, i.e., disables the video analytics discussed above with reference to FIG. 4, the audio analytics discussed above with reference to FIG. 5, and the LIDAR analytics analysis discussed above with reference to FIG. 13. When the "DISARM SYSTEM" switch is depressed again, the entire system turns back on, preferably resulting in a refresh of video alert engine 110c, audio alert engine 110d and LIDAR alert engine 110e (via a relearn command generated thereby).

The "VIDEO ANALYTICS", "AUDIO ANALYTICS" and "LIDAR ANALYTICS" switches independently disable the video alert engine, audio alert engine and LIDAR alert engine, respectively, while the "DISABLE PA" switch preferably disables announcements generated by the present invention to PA system 101c (FIG. 1) until re-enabled by the user.

Area 1406 displaying the streaming video signals from camera unit 102 (FIG. 1) in quad-view.

In the preferred embodiment, the positional information of all objects located within any of the selected watch zones is received by user control interface 1400, which preferably displays each object's location within positional map 1410, thereby mapping where the object is located relative to the front of police vehicle 101 (FIG. 1), indicated on positional map 1410 as triangle 1410a.

Positional map 1410 is preferably scalable, that is, the amount of area seen by positional map 1410 can be increased or decreased to show more or less area around police vehicle 101, respectively. In the preferred embodiment, the scale is able to be increased or decreased by sliding-scale touch switch 1408 located directly above positional map 1410. Sliding-scale touch switch 1408 allows the scale of positional map 1410 to adjust from, e.g., a radius of 30 meters to a radius of 150 meters, measured from the center of triangle 1410*a* to perimeter ring indicator 1410*b*.

As discussed above, alert notifications to terminal 101*d* are preferably displayed within area 1412 such that notifications generated by video alert engine 110*c*, audio alert engine 110*d*, and LIDAR alert engine 110*e* are displayed one underneath the other. Additionally, the notifications are preferably color-coded based on whether same were generated by video alert engine 110*c*, audio alert engine 110*d*, and LIDAR alert engine 110*e*.

Figure 14B:
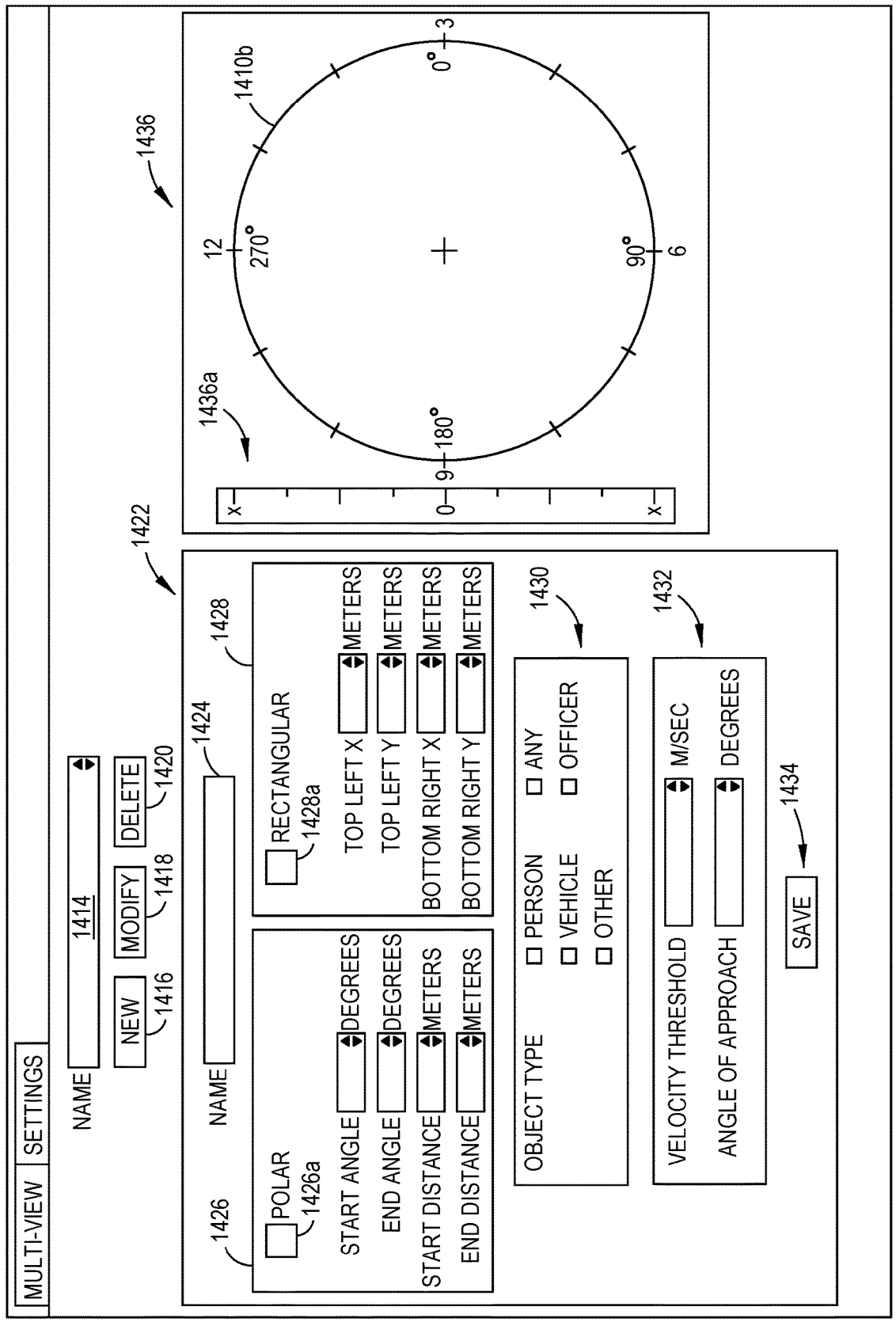

Turning now to FIG. 14B, the preferred layout of the settings screen of the user control interface capable of being displayed on the monitor (not shown) of terminal 101*d* is shown. The settings screen allows a user to create new watch zone/watch mode configurations, as well as to modify and/or delete predefined watch zone/watch mode configurations.

With reference to FIG. 14B, the settings screen of the user control interface preferably comprises a plurality of touch switches 1416, 1418 and 1420 to allow the user to create a new watch zone/watch mode configuration, or modify or delete predefined watch zone/watch mode configurations, respectively.

To create a new watch zone/watch mode configuration, a user selects "new" button 1416, which preferably enables informational input within area 1422. Specifically, the user is preferably able to enter the desired name of the new watch zone/watch mode configuration at 1424 and select whether the watch zone will be polar or rectangular.

In the preferred embodiment, the user is able to enter information for either a polar watch zone configuration within area 1426 or a rectangular watch zone configuration within area 1428, but not both, via selecting "polar" button 1426*a* or "rectangular" button 1428*a*, respectively Selecting "polar" button 1426*a* allows the user to select a start and an end angle, as well as a start and an end distance within area 1426. In the preferred embodiment, entering a value for end distance is optional, and its default value is zero. In the preferred embodiment, these values are selectable via up/down scroll tools adjacent each input box, with angles measured in degrees and selectable in 5-degree increments, and distance measured in meters and selectable in 2.5-meter increments.

By way of example, and with reference to FIG. 8, in the event no value for end distance is entered, the watch zone created thereby would be similar to watch zone 802 formed by ARC1 and bounded on a first side by the start angle (A1) and on the other side by the end angle (A2).

In the event a value for end distance is entered, the watch zone created thereby would comprise the area between the two arcs, bounded on a first side by the start angle and on the other side by the end angle. By way of example, and with reference to FIG. 8, the watch zone created thereby would be similar to watch zone 804 formed between ARC1 and ARC2 and bounded on a first side by the start angle A3 and on the other side by the end angle A4.

Selecting "rectangular" button 1428*a* allows the user to select the coordinates of the two points which form the rectangular watch zone, to wit, top-left XY coordinate and bottom-right XY coordinate. In the preferred embodiment, these values are selectable via up/down scroll tools adjacent each input box, with distance measured in meters and selectable in 2.5-meter increments.

In the preferred embodiment, the information entered within area 1426 or area 1428 is depicted graphically within area 1436, preferably by shading the area created by the watch zone within perimeter ring indicator 1410*b*, to provide the user with visual information when creating the watch zone. Variable ruler 1436*a* preferably automatically depicts the scale of the watch zone (based on start distance and end distance in area 1426 or XY coordinates in area 1428).

The watch mode parameter "object type" options are selectable within area 1430, and the indicants of motion, to wit, velocity threshold and angle of approach, are selectable within area 1432. In the preferred embodiment, the velocity threshold and angle of approach values are selectable via up/down scroll tools adjacent each input box, with velocity measured in meters per second and selectable in gradated increments (e.g., 0.125 m/s increments up to 0.50 m/s, 0.25 m/s up to 2.0 m/s, 0.50 m/s increments up to 15.0 m/s and 1.0 m/s increments up to 50 m/s) and angle of approach measured in degrees and selectable in 5-degree increments.

Upon entering all requisite information within area 1422 necessary to create the watch zone, the user can save this information via "save" button 1434 and the name of the watch zone/watch mode configuration entered in area 1424 will preferably be listed both within area 1402 (FIG. 14A) and 1414.

To modify an existing watch zone/watch mode configuration, a user is capable of selecting the name of the watch zone/watch mode configuration at 1414 via the adjacent up/down scroll tool. By selecting "modify" button 1418, the information comprising the selected watch zone/watch mode configuration is preferably pre-populated within the relevant areas of area 1422, allowing the user to modify the parameters as desired. As above, the watch zone is preferable also graphically displayed within area 1436. The modifications are capable of being saved via "save" button 1434.

To delete an existing watch zone/watch mode configuration, a user is capable of selecting the name of the watch zone/watch mode configuration at 1414 via the adjacent up/down scroll tool, and the information comprising the selected watch zone/watch mode configuration is preferably pre-populated within the relevant areas of area 1422, allowing the user to review this information and confirm that the selected watch zone/watch mode configuration was the one the user intended to select. Selecting "delete" button 1420 preferably causes a pop-up window (not shown) to appear in the foreground of the screen, requiring the user to "confirm" that the selected watch zone/watch mode configuration is to be deleted. Upon confirmation, the selected watch zone/watch mode configuration is preferably deleted from both area 1414, as well as area 1402 (FIG. 14A).

While the present invention has been described with reference to public service vehicles, such as police vehicle 101, the present invention is also capable of being deployed on other mobile platforms, for example, SWAT and military vehicles, armored trucks, mobile protection details, tractor trailers (also referred to as semi-trailer trucks or 18-wheelers) and construction vehicles.

Deployment on SWAT and military vehicles, armored trucks, and mobile protection details allow a surveillance perimeter, to wit, watch zones, to be established to alert the users thereof to whatever types of threats or potential threats such users may determine, via the watch zones' corresponding watch mode parameters, as discussed above.

For vehicles either not having or not desiring a light bar, the present invention is equally deployable on a suitable mounting plate. FIG. 15 is a front profile view of a second embodiment of the present invention. FIG. 16 is a top view of the second embodiment of the present invention shown in FIG. 15.

Turning now to FIGS. 15 and 16, mounting plate 1502 is attachable to a vehicle or other mobile platform via suitable mounting brackets 1504. Cameras 102a-d, microphone 106a, LIDAR sensors 114a and 114b, base plates 602a and 602b, scatter shields 604a and 604b, and spacer 606 are preferably mounted thereon, allowing the present invention to be deployable on mobile platforms not having or not desiring a light bar.

On mobile platforms having a relatively elongated roof along its longitudinal axis, such as a trailer being transported by a tractor trailer, the terminal ends of the trailer's roof may interfere with the coverage areas of LIDAR sensors 114 (FIG. 2) and/or cameras 102 (FIG. 2) for configurations shown with reference to FIG. 2 or FIG. 15 mounted in the center thereof.

Figure 18:
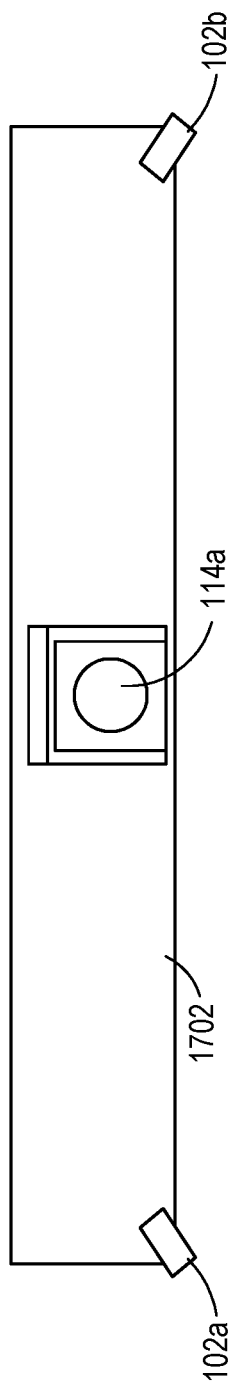
FIG. 18 is a top view of the third embodiment of the present invention shown in FIG. 17.
Figure 17:
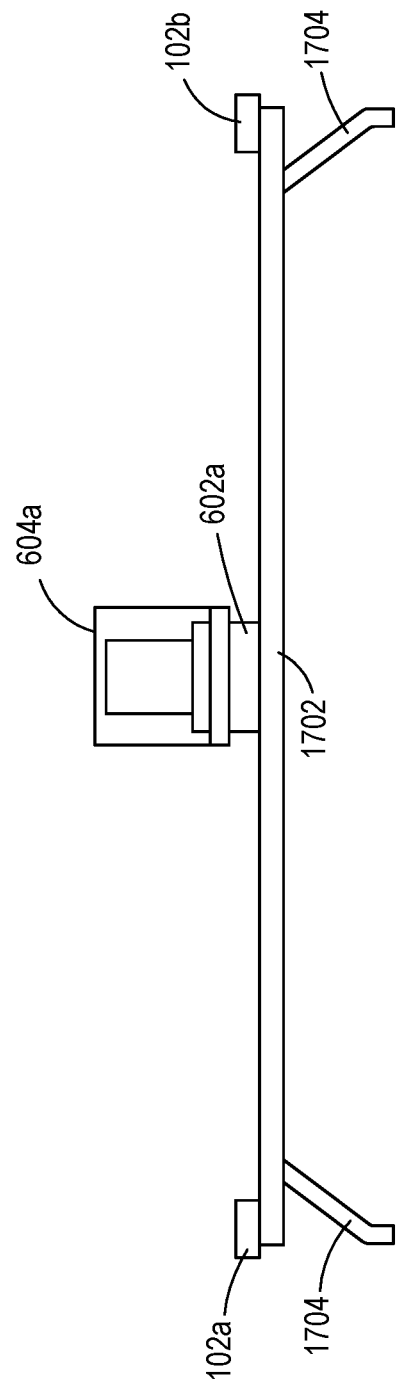
FIG. 17 is a front profile view of a third embodiment of the present invention.

FIG. 17 is a front profile view of a third embodiment of the present invention. FIG. 18 is a top view of the third embodiment of the present invention shown in FIG. 17.

Turning now to FIGS. 17 and 18, mounting plate 1702 is attachable to a vehicle or other mobile platform via suitable mounting brackets 1704. Cameras 102a and 102b, LIDAR sensor 114a, base plate 602a and scatter shield 604a are preferably mounted thereon.

In order to cover both the front and back ends of a mobile platform having a relatively elongated roof, such as a trailer being hauled by a tractor trailer, two mounting plates 1702 configured as shown with reference to FIGS. 17 and 18 are preferably mounted thereon.

Specifically, a first mounting plate configured as shown with reference to FIGS. 17 and 18 is preferably mounted at the front end of the trailer's roof such that cameras 102a and 102b face forward (in the direction of travel), and a second mounting plate configured as shown with reference to FIGS. 17 and 18 is preferably mounted at the opposite end of the trailer's roof such that cameras 102a and 102b face rearward (opposite the direction of travel). This mounting configuration positions scatter shields 604a located on the first and second mounting brackets to be diametrically-opposed to each other, to shield the first LIDAR sensor from the second LIDAR sensor, and vice versa, as discussed above.

In the event of a blind spot in video coverage on either side of the trailer between the first and second mounting plates 1702 that cannot be cured with cameras having a wider field of view, a mounting plate having two cameras, each on opposite ends thereof (not shown), can be mounted in the center of the trailer, thereby alleviating any visual blind spots. Attachment of the aforesaid mounting bracket with cameras to or near the center of the trailer to cover the driver's side and passenger's side thereof would allow the driver to see all sides of the trailer, including those blind-spots not viewable using side mirrors. In this way, the driver can be aware of another vehicle or other object that may be located in a blind spot on either side of the trailer, allowing the driver to avoid a potential collision therewith.

Figure 19:
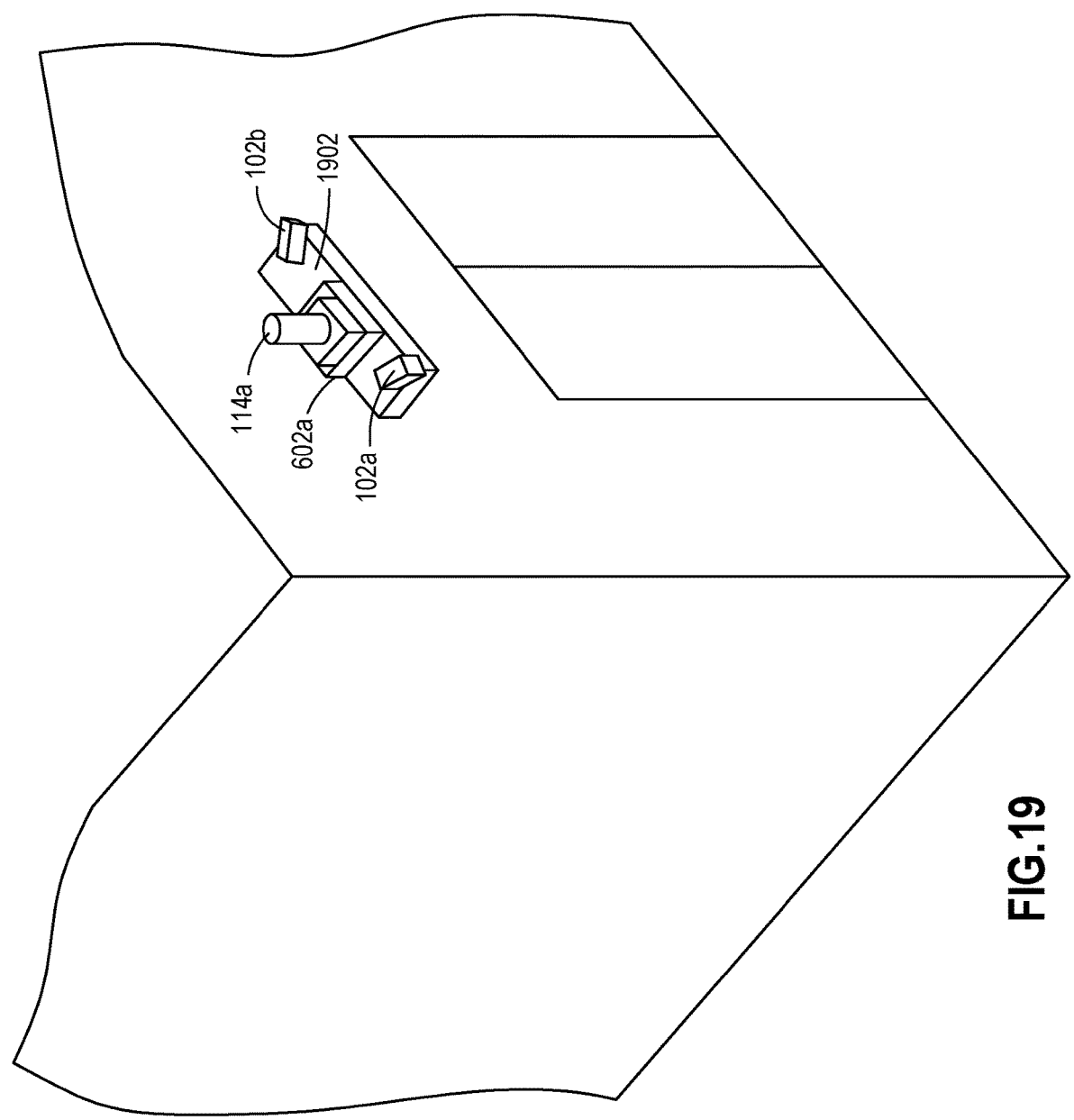
FIG. 19 illustrates a fourth embodiment of the present invention, shown mounted on a stationary object, such as over the entryway of a building.

FIG. 19 illustrates a fourth embodiment of the present invention, shown mounted on a stationary object, such as over the entryway of a building. Turning now to FIG. 19, mounting plate 1902 is attachable to a building or other stationary platform via suitable mounting brackets (not shown). Cameras 102a and 102b, LIDAR sensor 114a and base plate 602a are preferably mounted thereon.

The configuration shown with reference to FIG. 19 allows enhanced security at the building's ingress and egress points, and can also be mounted on any or all other sides of the building, allowing for 360-degree threat detection and notification around the entire building.

The configuration shown with reference to FIG. 19 can also be field mounted, e.g., on a tripod located on the ground or in a tree, to provide 360-degree threat detection and notification around and/or covering a zone of interest.

The present invention is equally capable of being deployed on or around other stationary platforms, for example, governmental buildings, federal depositories, military barracks, check points, perimeter-patrol points, power plants, bridges, tunnels, and other sensitive installations and structures of interest to national security, and the like.

Other mobile and stationary deployment opportunities will be obvious to one skilled in the art based on the teachings of the present invention.

Although illustrative embodiments of the present invention have been described in detail with reference to the accompanying drawings, it is to be understood that the invention is not limited to those precise embodiments. Various changes or modifications may be effected therein by one skilled in the art without departing from the scope or spirit of the invention.

What we claim as our invention is:

1. A threat detection and notification system comprising:
   a LIDAR unit operatively connected to a platform, said LIDAR unit capable of detecting a first object in its field of view during a first and subsequent refresh scans, and outputting point cloud data representative of the first object detected in a refresh frame corresponding to every refresh scan;
   a server operatively connected to said LIDAR unit, said server capable of receiving the point cloud data and determining, for the first object detected within each refresh frame, a predetermined set of object-specific attributes, including the first object's object type;
   a user control interface operatively connected to said server, said user control interface capable of creating a watch zone defining an area of interest less than said LIDAR unit's field of view, said user control interface further capable of defining a plurality of watch mode parameters associated with said watch zone, wherein at least one watch mode parameter includes object type; and
   a LIDAR alert engine operatively connected to said server, said LIDAR alert engine capable of determining whether the first object detected in each refresh frame is located within the watch zone, and, if the first object is within the watch zone, calculating at least one indicant of motion of the first object, and comparing the object type and the at least one indicant of motion of the first object to the defined watch mode parameters, wherein said LIDAR alert engine is further capable of alerting a predetermined user that the first object is within the watch zone in the event the aforementioned comparison indicates an alert condition.

2. The threat detection and notification system of claim 1, wherein the watch zone capable of being created by said user control interface is a rectangular watch zone.

3. The threat detection and notification system of claim 1, wherein the watch zone capable of being created by said user control interface is a polar watch zone.

4. The threat detection and notification system of claim 1, wherein the object type includes "person", "vehicle", "other" and/or "officer".

5. The threat detection and notification system of claim 1, wherein the watch mode parameters further include velocity.

6. The threat detection and notification system of claim 1, wherein the watch mode parameters further include angle of approach relative to a predetermined reference point.

7. The threat detection and notification system of claim 1, wherein the at least one indicant of motion of the first object includes the first object's velocity.

8. The threat detection and notification system of claim 1, wherein the at least one indicant of motion of the first object includes the first object's angle of approach relative to a predetermined reference point.

9. The threat detection and notification system of claim 1, wherein said platform is a mobile platform having a light bar, and wherein said LIDAR unit is operatively connected to said light bar.

10. The threat detection and notification system of claim 1, wherein said platform is a stationary platform having a mounting plate, and wherein said LIDAR unit is operatively connected to said mounting plate.

11. The threat detection and notification system of claim 1, said system further comprising:
    a camera unit operatively connected to said platform, said camera unit capable of capturing streaming video data having a plurality of individual video frames;
    a video interface operatively connected to said camera unit, said video interface capable of receiving the captured streaming video data; and
    said server operatively connected to said video interface, said server further capable of receiving the captured streaming video data and making at least a portion of same available to the predetermined user.

12. The threat detection and notification system of claim 11, wherein said server is further capable of determining whether a second object captured in a video frame matches an object from a list of predetermined objects, and, if so, overlaying a graphics box around the second object such that the graphics box is capable of being viewed simultaneously with the video frame that includes the second object.

13. The threat detection and notification system of claim 11 further comprising a video alert engine operatively connected to said server, said video alert engine capable of determining whether a second object captured in a video frame matches an object from a list of predetermined objects, and, if so, alerting the predetermined user to the presence of the second object.

14. The threat detection and notification system of claim 1, said system further comprising:
    a microphone unit capable of capturing streaming audio signal;
    an audio interface operatively connected to said microphone unit, said audio interface capable of receiving the captured streaming audio signal; and
    said server operatively connected to said audio interface, wherein said server is capable of receiving the captured streaming audio signal, and wherein said server is further capable of making at least a portion of the captured streaming audio signal available to the predetermined user.

15. The threat detection and notification system of claim 14 further comprising an audio alert engine operatively connected to said server, said audio alert engine capable of determining whether a portion of the captured streaming audio signal matches a predetermined sound type and, if so, alerting the predetermined user to the presence of the predetermined sound type.

16. The threat detection and notification system of claim 14, wherein said microphone unit is operatively connected to said platform.

17. The threat detection and notification system of claim 14, wherein said microphone unit is capable of being positioned on the predetermined user.

18. A threat detection and notification system comprising:
    a LIDAR unit operatively connected to a platform, said LIDAR unit capable of detecting a first object in its field of view during a first and subsequent refresh scans, and outputting point cloud data representative of the first object detected in a refresh frame corresponding to every refresh scan;
    a camera unit operatively connected to said platform, said camera unit capable of capturing streaming video data having a plurality of individual video frames;
    a video interface operatively connected to said camera unit, said video interface capable of receiving the captured streaming video data;
    a server operatively connected to said LIDAR unit and said video interface, said server capable of receiving the point cloud data and determining, for the first object detected within each refresh frame, a predetermined set of object-specific attributes, including the first object's object type, said server further capable of receiving the captured streaming video data;
    a user control interface operatively connected to said server, said user control interface capable of creating a watch zone defining an area of interest less than said LIDAR unit's field of view, said user control interface further capable of defining a plurality of watch mode parameters associated with said watch zone, wherein at least one watch mode parameter includes object type;
    a LIDAR alert engine operatively connected to said server, said LIDAR alert engine capable of determining whether the first object detected in each refresh frame is located within the watch zone, and, if the first object is within the watch zone, calculating at least one indicant of motion of the first object, and comparing the object type and the at least one indicant of motion of the first object to the defined watch mode parameters, wherein said LIDAR alert engine is further capable of alerting a predetermined user that the first object is within the watch zone and in the event the aforementioned comparison indicates an alert condition; and
    a video alert engine operatively connected to said server, said video alert engine capable of determining whether a second object captured in a video frame matches an object from a list of predetermined objects, and, if so, alerting the predetermined user to the presence of the second object.

19. The threat detection and notification system of claim 18, wherein the object type includes "person", "vehicle", "other" and/or "officer".

20. A threat detection and notification system comprising:
    a LIDAR unit operatively connected to a platform, said LIDAR unit capable of detecting a first object in its field of view during a first and subsequent refresh scans, and outputting point cloud data representative of the first object detected in a refresh frame corresponding to every refresh scan;
    a camera unit operatively connected to said platform, said camera unit capable of capturing streaming video data having a plurality of individual video frames;
    a microphone unit capable of capturing streaming audio signal;
    an audio/video interface operatively connected to said camera unit and said microphone unit, said audio/video interface capable of receiving the captured streaming video data and the captured streaming audio signal;
    a server operatively connected to said LIDAR unit and said audio/video interface, said server capable of receiving the point cloud data and determining, for the first object detected within each refresh frame, a predetermined set of object-specific attributes, including the first object's object type, said server further capable of receiving the captured streaming video data and the captured streaming audio signals;

a user control interface operatively connected to said server, said user control interface capable of creating a watch zone defining an area of interest less than said LIDAR unit's field of view, said user control interface further capable of defining a plurality of watch mode parameters associated with said watch zone, wherein at least one watch mode parameter includes object type;

a LIDAR alert engine operatively connected to said server, said LIDAR alert engine capable of determining whether the first object detected in each refresh frame is located within the watch zone, and, if the first object is within the watch zone, calculating at least one indicant of motion of the first object, and comparing the object type and the at least one indicant of motion of the first object to the defined watch mode parameters, wherein said LIDAR alert engine is further capable of alerting a predetermined user that the first object is within the watch zone and in the event the aforementioned comparison indicates an alert condition;

a video alert engine operatively connected to said server, said video alert engine capable of determining whether a second object captured in a video frame matches an object from a list of predetermined objects, and, if so, alerting the predetermined user to the presence of the second object; and an audio alert engine operatively connected to said server, said audio alert engine capable of determining whether a portion of the captured streaming audio signal matches a predetermined sound type and, if so, alerting the predetermined user to the presence of the predetermined sound type.

* * * * *